United States Patent
Reynolds et al.

(10) Patent No.: US 9,281,769 B2
(45) Date of Patent: Mar. 8, 2016

(54) ELECTRONIC CIRCUIT AND METHOD FOR ADJUSTING START-UP CHARACTERISTICS OF DRIVE SIGNALS APPLIED TO AN ELECTRIC MOTOR

(71) Applicant: Allegro Microsystems, LLC, Worcester, MA (US)

(72) Inventors: Timothy Reynolds, Westborough, MA (US); Chengyi Jin, Wayland, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 300 days.

(21) Appl. No.: 13/893,671

(22) Filed: May 14, 2013

(65) Prior Publication Data

US 2014/0340008 A1    Nov. 20, 2014

(51) Int. Cl.
*H02P 6/20* (2006.01)
*H02P 6/18* (2006.01)
*H02P 1/52* (2006.01)

(52) U.S. Cl.
CPC ........ *H02P 6/205* (2013.01); *H02P 1/52* (2013.01); *H02P 6/182* (2013.01); *H02P 2209/11* (2013.01)

(58) Field of Classification Search
USPC .................. 318/430–433, 400.11, 400.2
See application file for complete search history.

(56) References Cited

U.S. PATENT DOCUMENTS

| | | | |
|---|---|---|---|
| 4,134,050 A * | 1/1979 | Sibalis | 318/267 |
| 4,409,533 A | 10/1983 | Kawabata | |
| 5,006,778 A * | 4/1991 | Bashark | 318/799 |
| 6,172,475 B1 * | 1/2001 | Fitzgibbon et al. | 318/266 |
| 7,034,478 B2 | 4/2006 | Bhaumik et al. | |
| 7,531,976 B2 | 5/2009 | Fukamizu et al. | |
| 7,590,334 B2 | 9/2009 | Yabusaki et al. | |
| 7,747,146 B2 | 6/2010 | Milano et al. | |
| 8,405,332 B1 | 3/2013 | Krishnamoorthy et al. | |
| 2006/0222345 A1 | 10/2006 | Wood | |
| 2009/0167220 A1 | 7/2009 | Kanamori | |
| 2011/0115423 A1 | 5/2011 | Kern et al. | |
| 2013/0009578 A1 | 1/2013 | Reynolds et al. | |

FOREIGN PATENT DOCUMENTS

| | | | |
|---|---|---|---|
| CN | 101026351 A | | 8/2007 |
| JP | 2008 245411 A | | 10/2010 |
| WO | WO 2009/020737 A2 | | 2/2009 |

OTHER PUBLICATIONS

U.S. Appl. No. 13/599,225, filed Aug. 30, 2012, Reynolds et al.
U.S. Appl. No. 13/599,234, filed Aug. 30, 2012, Reynolds et al.
PCT Search Report and Written Opinion dated Aug. 28, 2014; for PCT Pat. App. No. PCT/US2014/035825; 14 pages.

(Continued)

*Primary Examiner* — Bentsu Ro
(74) *Attorney, Agent, or Firm* — Daly, Crowley, Mofford & Durkee, LLP

(57) ABSTRACT

A motor control circuit and associated techniques can drive an electric motor in a start-up mode of operation followed by a normal mode of operation. The motor control circuit and techniques can receive a selection signal provided by a user that can select one of a plurality of sets of parameter values that determine characteristics of drive signals applied to the motor during the start-up mode of operation. The motor control circuit and associated techniques can synchronize operation between the start-up mode of operation and the normal mode of operation.

36 Claims, 15 Drawing Sheets

(56) References Cited

OTHER PUBLICATIONS

PCT Search Report and Written Opinion of the ISA dated Jan. 26, 2015; for PCT Pat. App. No. PCT/US2014/035820; 9 pages.
Taiwan Office Action and Search Report (English translation); for Taiwan Pat. App. No. 103116100; dated Jul. 14, 2015; 6 pages.
Notice of Allowance dated Jun. 25, 2013; for U.S. Appl. No. 13/893,678; 12 pages.
Taiwan Office Action and Search Report (English translation) dated Jul. 28, 2015; for Taiwan Pat. App. No. 103116102; 10 pages.
Response with English translated dated Oct. 15, 2015 for Taiwanese Office Action dated Jul. 14, 2015; For Taiwanese Pat. App. No. 103116100; 42 pages.
Response to Chinese Office Action with English Claims and Specification dated Oct. 29, 2015; For Chinese Pat. App. No. 103116102; 39 pages.
PCT International Preliminary Report on Patentability and Written Opinion of the ISA dated Nov. 26, 2015; For PCT App. No. PCT/US2014/035825; 12 pages.
PCT International Preliminary Report on Patentability and Written Opinion of the ISA dated Nov. 26, 2015; For PCT App. No. PCT/US2014/035820; 5 pages.

* cited by examiner

| | Bits | Set 1 | Set 2 | Set 3 | Set 4 | Set 5 | Set 6 | Set 7 | Set 8 | Set 9 | Set 10 | Set 11 | Set 12 |
|---|---|---|---|---|---|---|---|---|---|---|---|---|---|
| fixedIniDutyIn | 9 | 2% | val2a | val3a | val4a | val5a | val6a | val7a | val8a | val9a | val10a | val11a | val12a |
| alignDutyIncrTime | 10 | 20 ms | val2b | val3b | val4b | val5b | val6b | val7b | val8b | val9b | val10b | val11b | val12b |
| alignDutyIncr | 6 | 0.2% | val2c | val3c | val4c | val5c | val6c | val7c | val8c | val9c | val10c | val11c | val12c |
| alignThetaIncrTime | 9 | 2 ms | val2d | val3d | val4d | val5d | val6d | val7d | val8d | val9d | val10d | val11d | val12d |
| iniRampDuty | 9 | 7% | val2e | val3e | val4e | val5e | val6e | val7e | val8e | val9e | val10e | val11e | val12e |
| dutyIncr | 6 | 0.40% | val2f | val3f | val4f | val5f | val6f | val7f | val8f | val9f | val10f | val11f | val12f |
| freqUpdateTime | 8 | 100 ms | val2g | val3g | val4g | val5g | val6g | val7g | val8g | val9g | val10g | val11g | val12g |
| iniFreqSet | 5 | 2 Hz | val2h | val3h | val4h | val5h | val6h | val7h | val8h | val9h | val10h | val11h | val12h |
| noOfFreq | 5 | 5 | val2i | val3i | val4i | val5i | val6i | val7i | val8i | val9i | val10i | val11i | val12i |
| iniDutyAfterCoast | 9 | 7% | val2j | val3j | val4j | val5j | val6j | val7j | val8j | val9j | val10j | val11j | val12j |

| | Bits | Set 13 | Set 14 | Set 15 | Set 16 | Set 17 | Set 18 | Set 19 | Set 20 | Set 21 | Set 22 | Set 23 | Set 24 |
|---|---|---|---|---|---|---|---|---|---|---|---|---|---|
| fixedIniDutyIn | 9 | val13a | val14a | val15a | val16a | val17a | val18a | val19a | val20a | val21a | val22a | val23a | val24a |
| alignDutyIncrTime | 10 | val13b | val14b | val15b | val16b | val17b | val18b | val19b | val20b | val21b | val22b | val23b | val24b |
| alignDutyIncr | 6 | val13c | val14c | val15c | val16c | val17c | val18c | val19c | val20c | val21c | val22c | val23c | val24c |
| alignThetaIncrTime | 9 | val13d | val14d | val15d | val16d | va17d | val18d | val19d | val20d | val21d | val22d | val23d | val24d |
| iniRampDuty | 9 | val13e | val14e | val15e | val16e | val17e | val18e | val19e | val20e | val21e | val22e | val23e | val24e |
| dutyIncr | 6 | val13f | val14f | val15f | val16f | val17f | val18f | val19f | val20f | val21f | val22f | va231f | val24f |
| freqUpdateTime | 8 | val13g | val14g | val15g | val16g | val17g | val18g | val19g | val20g | val21g | val22g | val23g | val24g |
| iniFreqSet | 5 | val13h | val14h | val15h | val16h | val17h | val18h | val19h | val20h | val21h | val22h | val23h | val24h |
| noOfFreq | 5 | val13i | val14i | val15i | val16i | val17i | val18i | val19i | val20i | val21i | val22i | val23i | val24i |
| iniDutyAfterCoast | 9 | val13j | val14j | val15j | val16j | val17j | val18j | val19j | val20j | val21j | val22j | val23j | val24j |

*FIG. 12*

| Selection Value | Motor Voltage | | | |
|---|---|---|---|---|
| | | VMOT < Voltage A | Voltage A <=VMOT <=Voltage B | VMOT > Voltage B |
| 0 | | Set 1 | Set 1 | Set 1 |
| 1 | | Set 2 | Set 2 | Set 2 |
| 2 | | Set 3 | Set 3 | Set 3 |
| 3 | | Set 4 | Set 4 | Set 4 |
| 4 | | Set 5 | Set 5 | Set 5 |
| 5 | | Set 6 | Set 6 | Set 6 |
| 6 | | Set 7 | Set 7 | Set 7 |
| 7 | | Set 8 | Set 8 | Set 8 |
| 8 | | Set 9 | Set 9 | Set 9 |
| 9 | | Set 10 | Set 10 | Set 10 |
| 10 | | Set 11 | Set 11 | Set 11 |
| 11 | | Set 12 | Set 12 | Set 12 |
| 12 | | Set 13 | Set 14 | Set 15 |
| 13 | | Set 16 | Set 17 | Set 18 |
| 14 | | Set 19 | Set 20 | Set 21 |
| 15 | | Set 22 | Set 23 | Set 24 |

*FIG. 13*

ELECTRONIC CIRCUIT AND METHOD FOR ADJUSTING START-UP CHARACTERISTICS OF DRIVE SIGNALS APPLIED TO AN ELECTRIC MOTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to electric motor control circuits and, more particularly, to an electric motor control circuit that can adjust start-up drive signal characteristics applied to an electric motor during a start-up mode of operation in accordance with a user input and that can synchronize the start-up mode of operation with a normal mode of operation that occurs thereafter.

BACKGROUND OF THE INVENTION

Circuits to control and drive brushless DC (BLDC) electric motors are known. In some arrangements, the circuits provide a particular a ramp-up of the speed of the electric motor when the electric motor is first powered up. However, such circuits are only able to provide one particular predetermined type of ramp-up.

Some known electric motor drive circuits are described in U.S. Pat. No. 7,590,334, issued Sep. 15, 2009, U.S. Pat. No. 7,747,146, issued Jun. 29, 2010, U.S. patent application Ser. No. 13/271,723, filed Oct. 12, 2011, U.S. patent application Ser. No. 13/599,225, filed Aug. 30, 2012, and U.S. patent application Ser. No. 13/599,234, filed Aug. 30, 2012, all of which are incorporated herein by reference in their entireties and assigned to the assignee of the present invention.

A BLDC electric motor can be used in different applications. For example, the same BLDC electric motor can be used with different fan blade arrangements in different applications. Different types of BLDC electric motors can also exhibit different load behaviors versus speed.

Motor noise, vibration, and efficiency are influenced by a variety of characteristics.

For sensor-less motor drive arrangements (i.e., motor drivers that do not rely upon Hall Effect elements to sense position of the motor shaft), reliable start-up is an important part of the design. Some sensor-less motor drive arrangements rely upon so-called "back EMF," or simply "BEMF" generated on the motor windings to sense a position of a motor shaft. In order to sense the BEMF, the electric motor must be spinning at some minimum speed and drive signals to the electric motor must generally be turned off, and thus, BEMF is not conventionally used to sense motor position at the very beginning of a start-up of a motor.

Various methods have been used to start an electric motor. For example, a so-called "Trap Drive" arrangement has been used, in which motor windings of an electric motor are driven with trapezoidal (trap) drive signals through six states at a predetermined fixed rate during start-up. During start-up, in some embodiments, start-up motor current is controlled by pulse width modulation (PWM) of the trap drive signals, and in other embodiments, start-up motor current is controlled by current limiting of the trap drive signals. BEMF is checked during the start-up process and the commutation of the phases of the trap drive signals are synchronized with BEMF zero crossings.

After the electric motor is started with the above-described trap drive signals, in some embodiments, the motor control electronics continues to run the electronic motor with trap drive signals in a normal mode of operation.

One of the drawbacks of using the trap drive signals during start-up and/or during the normal mode of operation after start-up, is that the trap drive signals result in is audible noise from the electric motor due to vibrations. Even when the trap drive signals are used as an envelope for PWM drive signals with very low duty cycles and current levels, the noise can still be very prominent. For many applications, the noise is not acceptable.

Sine drives that result in sinusoidal currents in the motor windings are known. Sine drives are quieter than trap drives.

As described above, the BEMF signals are not available until the electric motor has achieved some minimum rotating speed. Thus, during start-up of the electric motor, a common method ramps up the motor slowly, without BEMF motor position information, and using a fixed and predetermined ramp-up rate and technique. However, different electric motors (e.g., motors with different inertial masses and coupled loads) require different motor drive signal start-up profiles.

A motor controller integrated circuit has only a limited number of pins. A motor controller integrated circuit must also be built for a low cost.

It would be desirable to provide a motor controller electronic circuit (either integrated or non-integrated) that uses a small number of pins, that is low cost (e.g., small silicon surface area), that can generate sine drive signals instead of trap drive signals for low noise, that can be used to drive a wide variety of types of electric motors, while providing a proper sine drive start-up profile synchronized with a sine drive normal mode of operation for each type of electric motor.

SUMMARY OF THE INVENTION

The present invention provides a motor controller electronic circuit (either integrated or non-integrated) that uses a small number of pins, that is low cost (e.g., small silicon surface area), that can generate sine drive signals instead of trap drive signals for low noise, that can be used to drive a wide variety of types of electric motors, while providing a proper sine drive start-up profile synchronized with a sine drive normal mode of operation for each type of electric motor.

In accordance with one aspect of the present invention, a method of driving, with a motor control circuit, a multi-phase motor having a plurality of motor windings, includes receiving, from outside of the motor control circuit, a selection signal. The method also includes identifying, with the motor control circuit, a set of parameter values from among a plurality of sets of parameter values retained on the motor control circuit, the identifying done in accordance with the selection signal. The method also includes determining, in accordance with the identified set of parameter values, with the motor control circuit, start-up signal characteristics of a plurality of drive signals coupled to the plurality of motor windings, wherein the determined start-up signal characteristics of the plurality of drive signals comprise a ramped start-up of the electric motor during a ramp-up time period during a start-up mode of operation. The method also includes generating, with the motor control circuit, the plurality of drive signals comprising the determined start-up signal characteristics to start the multi-phase motor spinning.

In accordance with another aspect of the present invention, a motor control circuit for driving a multi-phase motor having a plurality of motor windings includes a motor control circuit. The motor control circuit includes a start-up control module configured to: receive, from outside of the motor control circuit, a selection signal; identify set of parameter values from among a plurality of sets of parameter values retained on the motor control circuit, the identifying done in accordance with the selection signal; and determine, in accordance with the identified set of parameter values, start-up signal characteristics of a plurality of drive signals coupled to the plurality of motor windings. The determined start-up signal characteristics of the plurality of drive signals comprise a ramped start-up of the electric motor during a ramp-up time period during a start-up mode of operation. The motor control circuit is configured to generate the plurality of drive signals comprising the determined start-up signal characteristics to start the multi-phase motor spinning.

BRIEF DESCRIPTION OF THE DRAWINGS

The foregoing features of the invention, as well as the invention itself may be more fully understood from the following detailed description of the drawings, in which:

FIG. 12 is a table showing exemplary sets of start-up parameter values that can be used as the sets of start-up parameter values of FIG. 11;

FIG. 13 is a table showing a particular logic that can be used to combine a selection value provided by a user with a motor voltage in order to select which one of the plurality of sets of parameter values to use during the start-up time period.

DETAILED DESCRIPTION OF THE INVENTION

Before describing the present invention, some introductory concepts and terminology are explained. As used herein, the term "modulation waveform" is used to describe an envelope (i.e., a modulation envelope) or characteristic function of another signal, for example, a pulse width modulated (PWM) signal.

An exemplary normal mode of operation of a motor control circuit is generally described herein. During the normal mode of operation, the motor control circuit generates normal mode motor drive signals to cause an electric motor to continue rotating once it has been started. Further details of the exemplary normal mode of operation can be found in U.S. patent application Ser. No. 13/599,225, filed Aug. 30, 2012, and U.S. patent application Ser. No. 13/599,234, filed Aug. 30, 2012.

A start-up mode of operation, which precedes the normal mode of operation, is also described herein. During the start-up mode of operation, the motor control circuit generates start-up mode motor drive signals to cause an electric motor to begin rotating from zero speed.

A synchronization of motor drive signals between the start-up mode of operation and the normal mode of operation is also described herein.

While a particular normal mode of operation is described herein, it should be understood that the start-up mode of operation described herein can be followed by any type of normal mode of operation. It should also be understood that the synchronization techniques described herein can apply to other types of normal modes of operation.

Figure 1:
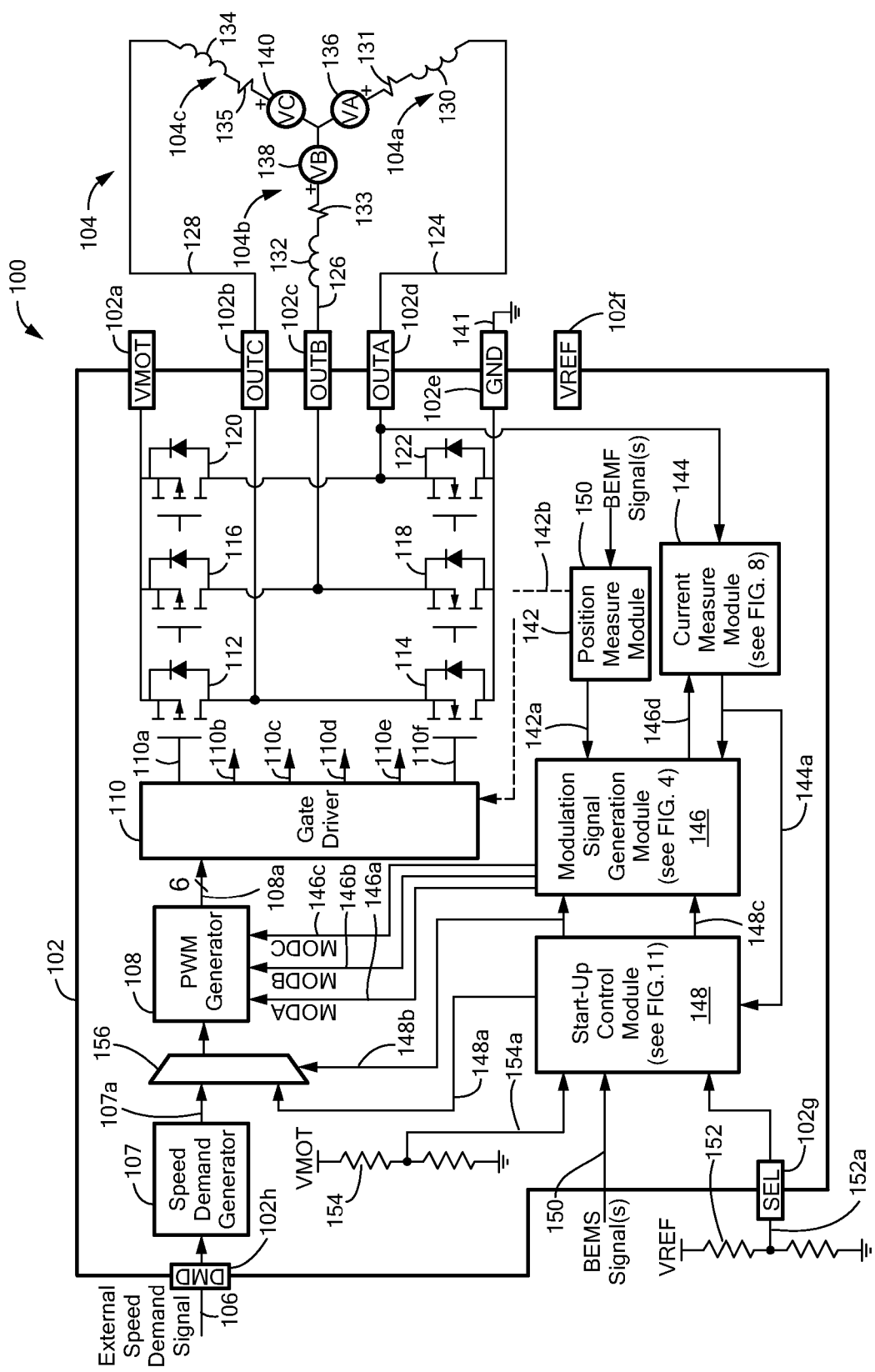
FIG. 1 is a block diagram of an exemplary motor control circuit having a modulation signal generation module, a current measurement module, a position measure module, and a start-up control module.

Referring to FIG. 1, an exemplary motor control circuit 102 is coupled to drive an electric motor 104.

The motor 104 is shown to include three windings 104a, 104b, 104c, which are each often depicted as a respective equivalent circuit having an inductor in series with a resistor and in series with a back EMF voltage source. For example, the winding A 104a is shown to include an inductor 130 in series with a resistor 131 and in series with a back EMF voltage source VA 136. The voltage of the back EMF voltage source VA 136 is not directly observable when a current is flowing in an associated motor winding, but it directly observable when the current through the associated winding is zero.

In general, the voltage across a motor winding, for example, across the winding A 104a, is governed by the following equation:

$$VoutA-Vcommon=VA+IR+LdI/dt,$$

where:

VoutA=observable voltage at one end of the winding A;
Vcommon=voltage at junction of the windings 104a, 104b, 104c;
R=resistance of the resistor 131;
L=inductance of inductor 130;
I=current through winding; and
VA=back EMF voltage Thus, it can be seen that, if the current through the winding 104a is zero, then VoutA=VA, which is an observable voltage.

The motor control circuit 102 can include nodes 102a-102h. In some embodiments, each one of the nodes 102a-102h corresponds to a respective integrated circuit pin.

The motor control circuit 102 can include a start-up control module 148. The start-up control module 148 can be coupled to receive a selection signal 152a from outside of the motor control circuit 102. In some embodiments, the selection signal 152a is generated by a resistor divider 152 provided by a user. The voltage divider 152 can be coupled to receive a reference voltage, VREF, which, in some embodiments, can be provided by the motor control circuit 102 at the node 102f. However, in other embodiments, the voltage divider 152 can be coupled to receive another voltage, for example, a voltage provided from outside of the motor control circuit 102.

In other embodiments, the selection signal 152a can be provided by other means and can have other characteristics. For example, in some other embodiments, the selection signal 152a can be provided from an amplifier outside of the motor control circuit 102. In some other embodiments, the selection signal 152a is a binary signal, for example, a PWM signal or a digital signal having information therein.

In some embodiments, the start-up control module 148 can also be coupled to receive a voltage signal 154a generated by a voltage divider 154. The voltage divider 154 can be coupled to receive the motor voltage, VMOT, and, therefore, the voltage signal 154a is representative of the motor voltage.

The start-up control module 148 is also coupled to receive one or more back EMF signals 150 from a respective one or more of the nodes 102b, 102c, 102d.

The start-up control module 148 is also coupled to receive a detected zero current signal 144a indicative of a zero current passing through the motor winding. Function of the detected zero current signal 144a is described more fully below in conjunction with FIGS. 8 and 9.

The start-up control module 148 can be configured to generate a start-up mode demand signal 148a, a start-up mode theta signal 148c, and a mode control signal 148b.

The start-up control module 148 is configured to provide the mode control signal 148b having at least two states. A first state of the mode control signal 148b results in the motor control circuit 102 performing the above-described start-up mode of operation, and a second different state of the mode control signal 148b results in the motor control circuit 102 performing the above-described normal mode of operation.

Further details of the start-up control module 148 are described below in conjunction with FIG. 11. However, let it suffice here to say that, during the start-up mode of operation, the motor control circuit 102 uses the start-up mode demand signal 148a and the start-up mode theta signal 148c, but uses other similar signals during the normal mode of operation.

The motor control circuit 102 includes a speed demand generator 107 coupled to receive an external speed demand signal 106 at the node 102h from outside of the motor control circuit 102. The external speed demand signal 106 can be in one of a variety of formats. In general the external speed demand signal 106 is indicative of a speed of the motor 104 that is requested from outside of the motor control circuit 102. The external speed demand signal 106 is used in the normal mode of operation.

The speed demand generator 107 is configured to generate a normal mode demand signal 107a. A 2:1 switch 156 is coupled to receive the normal mode demand signal 107a and also the start-up mode demand signal 148a. The 2:1 switch 156 is also coupled to receive the mode control signal 148b. A normal mode state of the mode control signal 148b causes the 2:1 switch 156 to pass the normal mode demand signal 107a through the 2:1 switch 156 as a selected demand signal 156a, while a start-up mode state of the mode control signal 148b causes the 2:1 switch 156 to pass the start-up mode demand signal 148a through the 2:1 switch 156 as the selected demand signal 156a.

The selected demand signal 156 is received by a pulse width modulation (PWM) generator 108. The PWM generator 108 is configured to generate PWM signals 108a, a maximum duty cycle of which is controlled by the selected demand signal 156a, i.e., by the normal mode demand signal 107a during the normal mode of operation, or by the start-up mode demand signal 148a during the start-up mode of operation.

The PWM generator 108 is also coupled to receive modulation waveforms 146a, 146b, 146c from a modulation signal generation module 146. The PWM signals 108a are generated with a modulation characteristic (i.e., a relative time-varying duty cycle) in accordance with the modulation waveforms 146a, 146b, 146c. Modulation waveforms and associated PWM signals are described more fully below in conjunction with FIG. 6. It will become apparent from discussion below that the modulation waveforms in the normal mode of operation have different characteristics than modulation waveforms in the start-up mode of operation.

The modulation signal generation module 146 is also coupled to receive the mode control signal 148b and the start-up mode theta signal 148c, which are described more fully below.

The motor control circuit 102 also includes a gate driver circuit 110 coupled to receive the PWM signals 108a and configured to generate PWM gate drive signals 110a, 110b, 110c, 110d, 110e, 110f to drive six transistors 112, 114, 116, 118, 120, 122 arranged as three half bridge circuits 112/114, 116/118, 120/122. The six transistors 112, 114, 116, 118, 120, 122 operate in saturation to provide three motor drive signals VoutA, VoutB, VoutC, 124, 126, 128, respectively, at the nodes 102d, 102c, 102b, respectively.

The motor control circuit 102 can also include a position measurement module 142, which can be coupled to receive back EMF signal(s) (e.g., can be coupled to one or more of the nodes 102b, 102c, 102d, at which include back EMF signals are directly observable at times when the motor windings 104a, 104b, 104c are not being driven by the motor drive signals 124, 126, 128, and respective winding currents are zero). The position measure module 142 is configured to generate a position reference signal 142a indicative of a rotational reference position of the motor 104.

The motor control circuit 102 can also include a current measurement module 144, which can be coupled to receive one of the motor drive signals 124, 126, 128. The current measurement module 144 is configured to generate a zero current signal 144a indicative of a zero crossing of the current in one or more of the motor windings. An exemplary current measurement module is described in further detail below in conjunction with FIG. 8.

The modulation signal generation module 146 is coupled to receive the position reference signal 142a and the zero current signal 144a. During the normal mode of operation, the modulation signal generation module 146 is configured to generate the modulation waveforms 146a, 146b, 146c having phases in accordance with a phase difference between the position reference signal 142a and the zero current signal 144a. An exemplary modulation signal generation module 146 is described below in conjunction with FIG. 4.

In contrast, during the start-up mode of operation, the modulation signal generation module 146 is configured to generate the modulation waveforms 146a, 146b, 146c under control of the start-up mode theta signal 148c.

The motor control circuit 102 can be coupled to receive the motor voltage VMOT, or simply VM, at the node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

As described above, during the normal mode of operation, the motor control circuit 102 can automatically adjust a timing, i.e., a phase, of the drive signals 124, 126, 128 in relation to a sensed rotational position of the motor 104.

From the above, it should be understood that, during the start-up mode of operation, the motor control circuit 102 operates using the start-up mode demand signal 148a and the start-up mode theta signal 148c. During the normal mode of operation, the motor control circuit operates using the normal mode demand signal 107a and using a theta signal generated within the modulation signal generation module 146 and described more fully below in conjunction with FIG. 4.

In general, the selected demand signal 156a applied to the PWM generator 108 is most closely associated with an amplitude of the motor drive signals 124, 126, 128 applied to the motor 104. In contrast, frequencies, i.e. rates, of the modulation waveforms 146a 146b, 146c are most closely associated with frequencies of the motor drive signals 124, 126, 128 applied to the motor. Both amplitude and frequency of the drive signals 124, 126, 128 influence a rotation speed of the motor 104

It will also be understood that the selection signal 152a requires only one pin on the motor control circuit 102.

Figure 2:
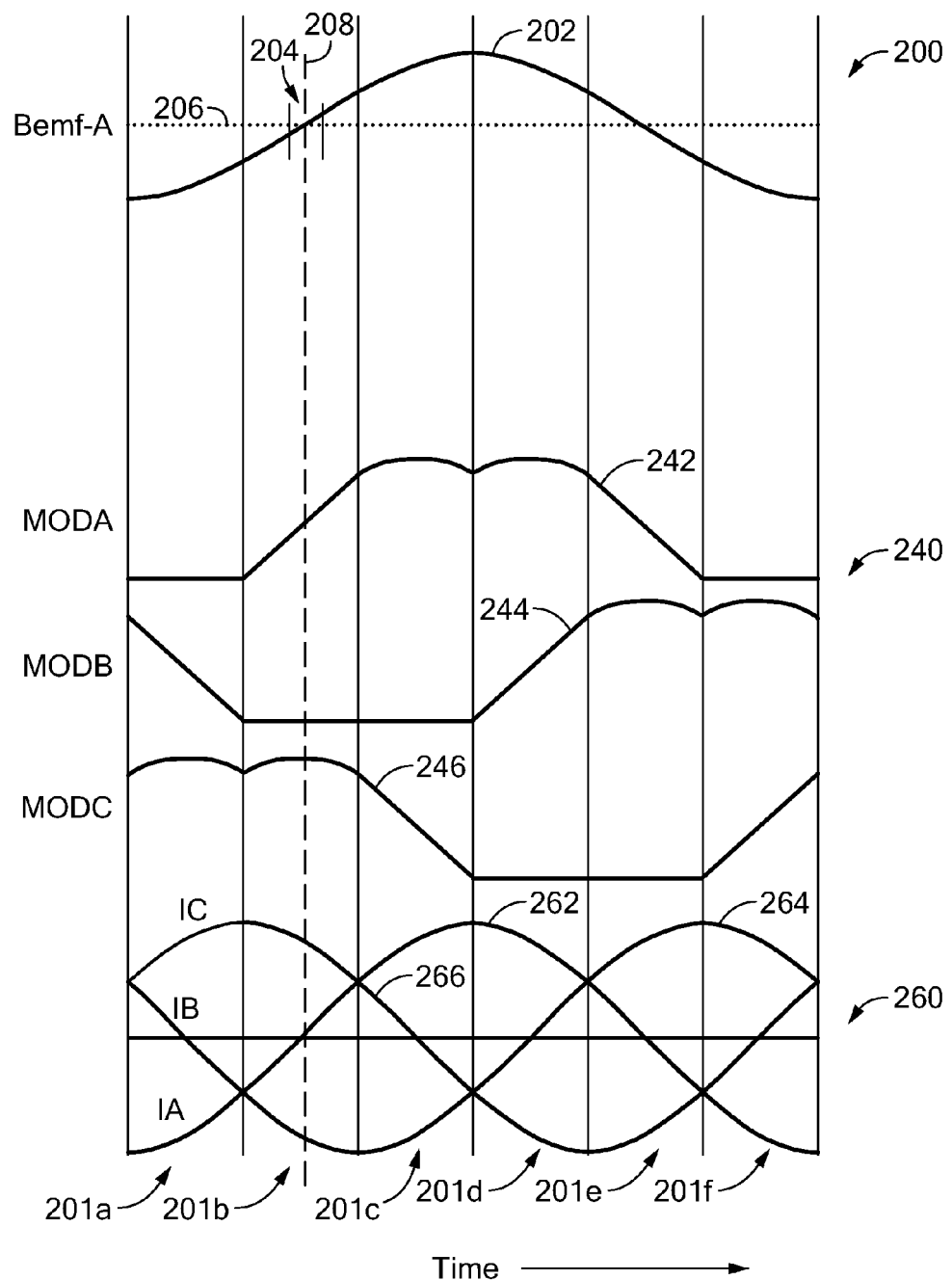
FIG. 2 is a graph showing a variety of waveforms associated with the exemplary motor control circuit of FIG. 1, in particular, when the motor control circuit is used to provide a sinusoidal drive to a motor.

Referring now to FIG. 2, graphs 200, 240, and 260 have a horizontal axes with scales in units of time in arbitrary units. The graphs 200, 220, 240 have vertical axes with scales in units of voltage in arbitrary units. The graph 260 has a vertical axis with a scale in units of current in arbitrary units.

A signal 202 is representative of a back EMF signal (i.e., a voltage signal) on one of the motor windings (e.g., winding A 104a) of the motor 104 of FIG. 1 when the motor 104 is spinning. The back EMF voltage 202 is generally sinusoidal. It will be understood that the back EMF signal 202 is only fully observable on a motor winding when the motor winding is not being driven by one of the drive signals 124, 126, 128 of FIG. 1.

In some embodiments of the motor control circuit 102 of FIG. 1, the zero crossing of the back EMF signal 202 can be used by the position measurement module 142 to identify a reference rotational position of the motor 104. Particularly during the normal mode of operation, it is desirable that the zero crossing of the back EMF signal 202 at a time 208 be coincident or nearly coincident with a zero current passing through the motor winding upon which the back EMF signal 202 is generated. Such a relationship will result in most efficient motor operation.

Signals 242, 244, 246 are generally representative of the above-described modulation waveforms 146a, 146b, 146c of FIG. 1 during both the normal mode and the start-up mode of operation. The modulation waveforms 242, 244, 246 are representative of modulation envelopes used to generate PWM signals to drive the motor 104. Correspondence between the modulation waveforms 242, 244, 246 and the PWM signals is described more fully below in conjunction with FIG. 6.

It will be recognized that the modulation waveform 242 is associated with the winding A 104a of FIG. 1 and generally aligns with the back EMF signal 202 that is associated with the same winding. The other modulation waveforms 244, 246 are associated with the other windings B, C 104b, 104c, respectively, of the motor 104 of FIG. 1.

Signals 262, 264, 266 are representative of currents that appear on the windings A, B, C 104a, 104b, 104c, respectively, of the motor 104 of FIG. 1 during the normal mode and the start-up mode of operation. It will be understood that the actual current signals on the motor windings may be more complex than those shown in the signals 262, 264, 266. However the current signals 262, 264, 266 are representative of an average current versus time through the three motor windings. It will be understood that the current 262 on the motor winding A 104a is generally in phase with the back EMF signal 202. However, there can be a phase difference between the current signal 262 and the associated back EMF signal 202 as described more fully below in conjunction with FIG. 3.

An electrical revolution of the motor 104 can be divided into six states, or time periods, 201a, 201b, 201c, 201d, 201e, 201f.

Figure 3:
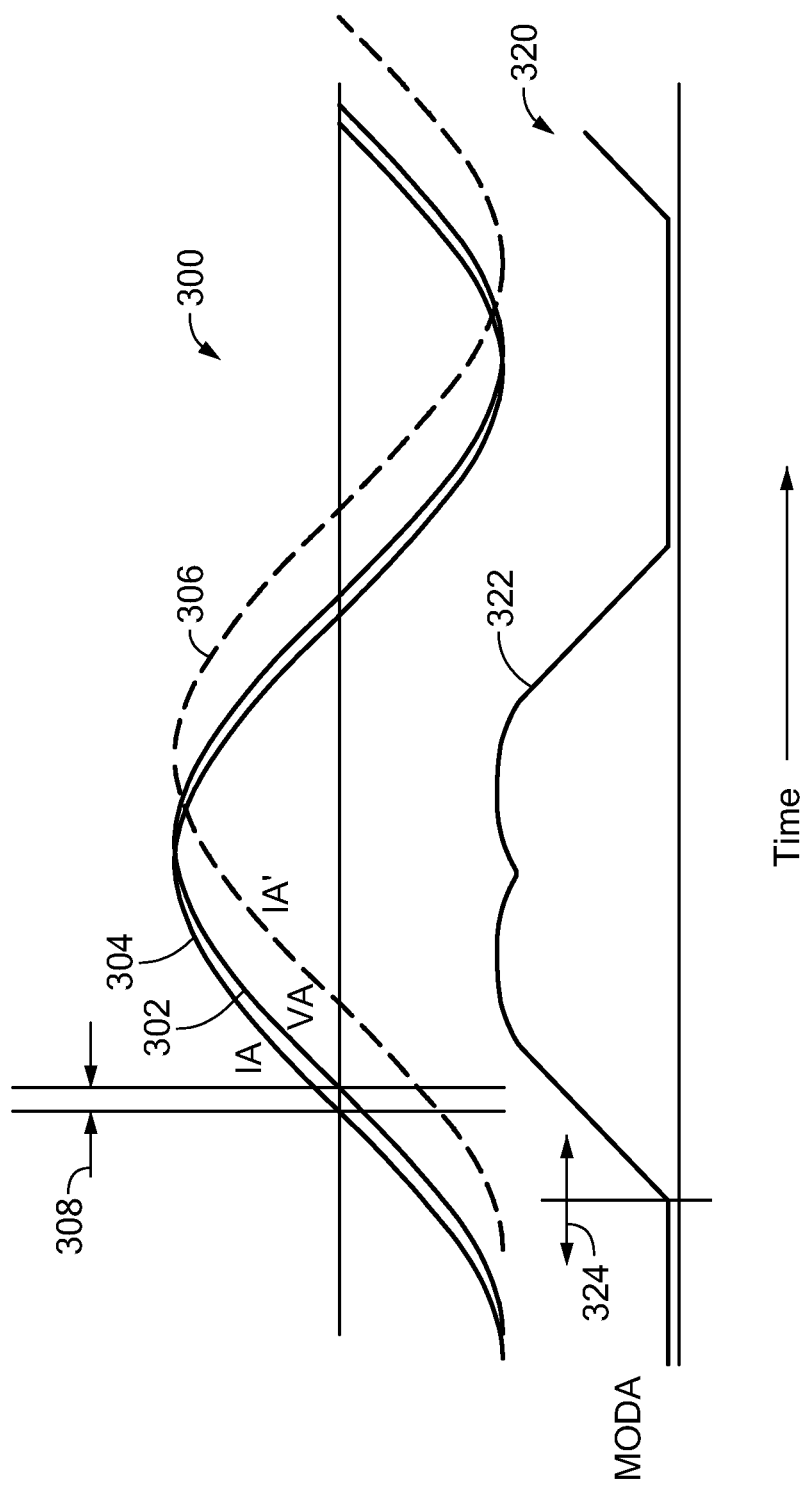
FIG. 3 is another graph showing a variety of waveforms associated with exemplary motor control circuit of FIG. 1, in particular, when the motor control circuit is used to provide a sinusoidal drive to the motor, and showing phase differences between a current signal and a position reference signal.

Referring now to FIG. 3, a graph 300 has a horizontal axis with a scale in units of time in arbitrary units. The graph 300 also has a vertical axis with a scale in units of voltage and current in arbitrary units. A graph 320 has a horizontal axis with a scale in units of time in arbitrary units. The graph 320 also includes a vertical axis with a scale in units of voltage in arbitrary units.

The graphs 300 and 320 are used to indicate phase adjustments that are performed during the exemplary normal mode of operation. However, other normal modes of operation, including normal modes of operation in which phase is not adjusted are also possible.

A signal 304 is representative of a current signal on the winding A 104a of FIG. 1. Thus, the signal 304 corresponds to the signal 262 of FIG. 2. A signal 302 is representative of a back EMF signal 136 on the winding A 104a of FIG. 1. Thus, the signal 302 corresponds to the signal 202 of FIG. 2. Zero crossings of the signals 302, 304 will be apparent. A time difference 308 is indicative of a time difference between a zero crossing of the back EMF signal 302 and a zero crossing of the current signal 304. Therefore, the time difference 308 is representative of a time difference between a rotational position reference (i.e., the zero crossing of the back EMF signal 302) and a zero current passing through the associated motor winding.

A signal 306 is representative of a current signal on the winding A 104a of FIG. 1 during a time period during which the motor 104 is accelerating in rotational speed or during which the motor 104 is rotating at high speed. It can be seen that relative phases have shifted. The zero crossing of the current signal 306 is retarded with respect to the zero crossing of the back EMF signal 302. The zero crossing of the back EMF signal 302 is indicative of a reference rotational position of the motor 104. The zero crossing of the current signal 306 is representative of a zero current through the motor winding A 104a. It is desirable that the zero crossings coincide in time and phase. A lack of time coincidence will result in increased motor noise and vibration, and decreased motor efficiency.

A modulation waveform 322 is the same as or similar to the modulation waveform 242 of FIG. 2. Thus, when the motor is accelerating or rotating rapidly, it can be seen that the current signal 306 is retarded relative to the modulation waveform 322. It would be desirable to advance the modulation waveform 322 (i.e., move the modulation waveform 322 to the left) to advance the current signal 306 so that a zero crossings of the current signal 306 can occur coincident or nearly coincident with the zero crossing of the back EMF signal 302, which is indicative of a rotational reference position of the motor 104.

In general, in the exemplary normal mode of operation, the modulation signal generation module 146 of FIG. 1 is able to advance or retard the various modulation waveforms 146a, 146b, 146c in accordance with a received rotational position reference signal 142a and in accordance with the zero current signal 144a, of which the back EMF signal 302 and the current signals 304, 306 are representative.

For conventional sinusoidal motor drive signals, such as those described above in conjunction with FIGS. 2 and 3, for reasons described above in conjunction with FIG. 1, it is not readily possible to observe and detect a zero crossing of the back EMF signal 302, because each one of the motor windings 104a, 104b, 104c is constantly being driven. In order to observe a back EMF signal, it is necessary to at least momentarily stop a drive signal to a motor winding. Thus, with a sinusoidal motor drive signal arrangement, in some embodiments, the sinusoidal drive signal to at least one of the windings 104a, 104b, 104c of the motor 104 can be stopped for a small time window in order to observe the zero crossing of the back EMF signal. To this end, in the motor control circuit 102 of FIG. 1, a control signal 142b used in the normal mode of operation can be provided by the position measurement module 142 to the gate driver 110. Other means of stopping the drives signals described below are used during the start-up mode of operation.

Figure 4:
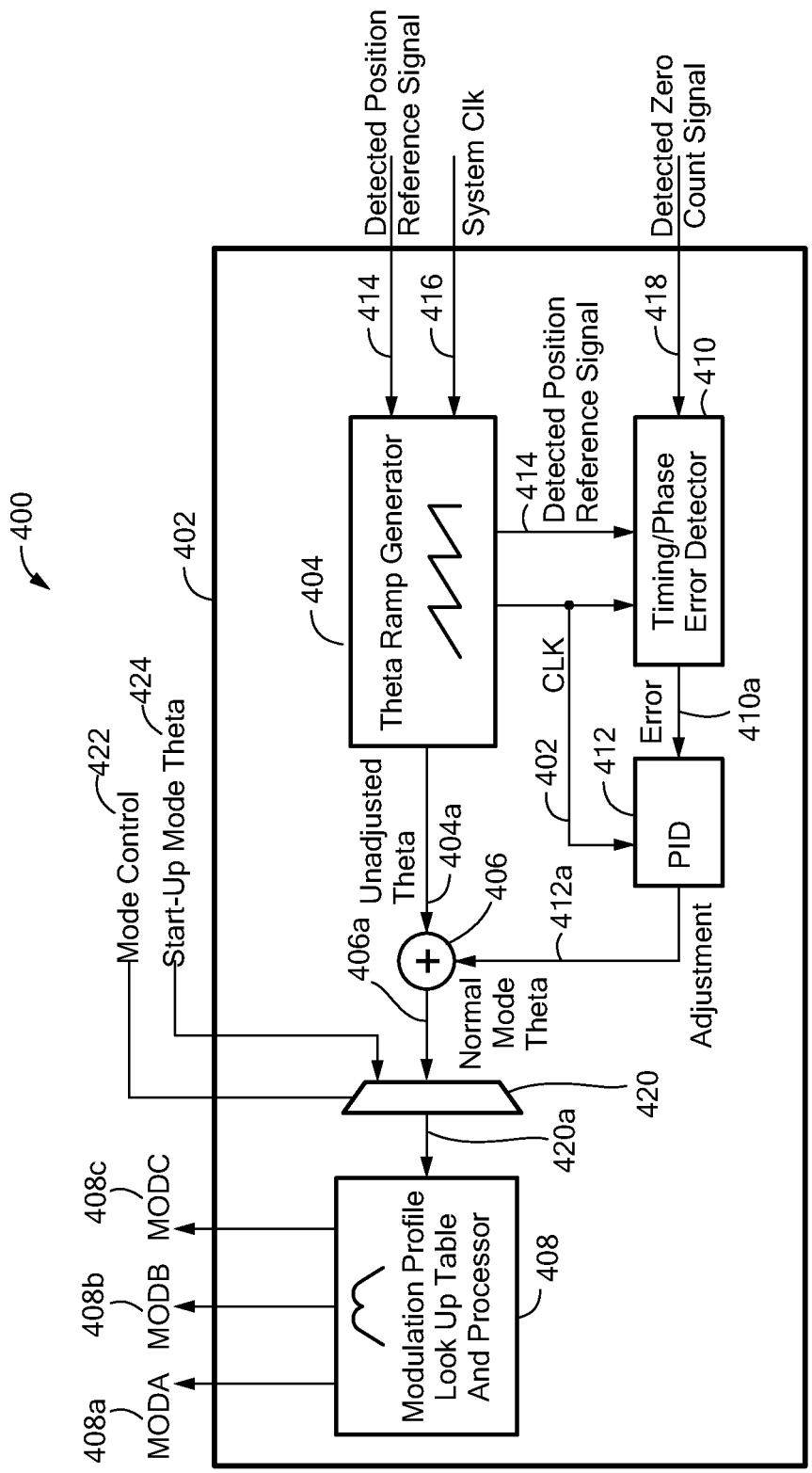
FIG. 4 is a block diagram of an exemplary modulation signal generation module that can be used as a modulation signal generation module of the exemplary motor control circuit of FIG. 1.

Referring now to FIG. 4, a modulation signal generation module 402 can be used as the modulation signal generation module 146 of FIG. 1.

The modulation signal generation module 402 is coupled to receive a detected position reference signal 414 and a detected zero current signal 418. The detected position reference signal 414 can be the same as or similar to the position reference signal 142a of FIG. 1. The detected zero current signal 418 can be the same as or similar to the zero current signal 144a of FIG. 1.

As described above, the detected position reference signal 414 can be generated in conjunction with zero crossings of a back EMF signal using a sinusoidal drive waveform by using a short time period during which the sinusoidal drive to a winding is stopped.

The modulation signal generation module 402 is also coupled to receive a system clock signal 416 having a fixed high frequency.

A so-called "theta ramp generator" 404, used in the exemplary normal mode of operation, is coupled to receive the detected position reference signal 414 and the system clock signal 416. The theta ramp generator 404 is configured to generate an unadjusted theta signal 404a, which can be a digital signal comprised of a sequence of values representative of a ramp signal that periodically reaches a terminal value and resets to zero. The reset time of the ramp signal is fixed in relation to the position reference (i.e., a fixed rotational position of the motor 104) of which the detected position reference signal 414 is indicative.

In operation, the theta ramp generator 404 can identify a time period, measured by counting a number of system clock transitions, between position references identified by the detected position reference signal 414. In other words, the theta ramp generator 404 can identify a time (i.e., a number of transitions of the system clock signal 416) that it takes the motor 104 to turn through one electrical rotation. The theta ramp generator 404 can divide the identified number of transitions of the system clock 416 by a fixed scalar, for example, by 256. Thus, a motor electrical revolution can be divided into 256 parts. Accordingly, the clock signal 402 can have a frequency that achieves, for example, 256 transitions during one electrical revolution of the motor. The clock signal 402 can be generated by and used by the theta ramp generator 404 to generate a rate at which ramp values of the unadjusted theta signal 404a are incremented and output within the unadjusted theta signal 404a. Thus, it will be understood that resets to zero of the ramp signal in the unadjusted theta signal 404a are achieved once for every electrical revolution of the motor, and there can be, for example, 256 steps in the ramp.

A timing/phase error detector 410, used in the exemplary normal mode of operation, is coupled to receive the detected zero current signal 418, coupled to receive the detected position reference signal 414, and coupled to receive the clock signal 402.

During the exemplary normal mode of operation, the timing/phase error detector 410 is configured to identify a time difference (i.e., a phase difference) between a position reference identified by the detected position reference signal 414 and a zero current crossing identified by the detected zero current signal 418.

Referring briefly again to FIG. 3, in other words, the timing/phase error detector 410 is operable to identify a time difference between the zero crossing of the current signal 304 or 306 and a zero crossing of a back EMF voltage signal 302.

Referring again to FIG. 4, the timing/phase error detector 410 is configured to generate an error signal 410a, which, in some embodiments, can be a digital value, representative of the identified time (i.e., phase) difference.

A proportional integrator differentiator (PID), or, in other embodiments, a proportion integrator (PI), can be coupled to receive the error signal 410a, and configured to essentially filter the error signal 410a to generate an adjustment signal 412a. In some embodiments, the adjustment signal 412a can be a digital value proportional to the time difference identified by the timing/phase error detector 410.

A summing module 406 is coupled to receive the unadjusted theta signal 404a (i.e., a sequential set of digital values representative of a resetting ramp signal at a fixed phase), coupled to receive the adjustment signal 412a, and configured to generate a normal mode theta signal 406a.

The modulation signal generation module 402 can also be coupled to receive a start-up mode theta signal 424 and a mode control signal 422. The start-up mode theta signal 424 can be the same as or similar to the start-up mode theta signal 148c of FIG. 1, and the mode control signal 422 can be the same as or similar to the mode control signal 148b of FIG. 1.

A 2:1 switch 420 can be coupled to receive the normal mode theta signal 406a and the start-up mode theta signal 424. A state of the mode control signal 422 determines which one of the input signals to the 2:1 switch 420 becomes a selected theta signal 420a.

As described above, the normal mode theta signal 406a is used in the normal mode of operation, and the start-up mode theta signal 424 is used during the start-up mode of operation.

In the normal mode of operation, it should be understood that the selected theta signal 420a (i.e., the normal mode theta signal 406a) is a resetting ramp signal like the unadjusted theta signal 404a, but for which the reset times of the ramp signal are moved in time, i.e., adjusted phase, in accordance with a value of the adjustment signal 412a. In the start-up mode of operation, it should be understood that the selected theta signal 420a (i.e., the start-up mode theta signal 424) is also resetting ramp signal, a reset rate of which is controlled by the start-up control module 148 of FIG. 1, and the adjustment signal 412a is not used.

A modulation profile look up table and processor 408 is coupled to receive the selected theta signal 420a. The modulation profile look up table and processor 408 is configured to store therein values representative of one or more modulation profiles, for example, the modulation profile 242 of FIG. 2.

In operation, the selected theta signal 420a (i.e., either the normal mode theta signal 406a or the start-up mode theta signal 424) is used to sequence between values of the stored modulation signal within the modulation profile look up table and processor 408.

It will be understood that, in the normal mode of operation, a phase of the selected theta signal 420a, of which reset portions of the normal mode theta signal 406a are representative, is adjustable according to a time difference between a position reference identified within the detected position reference signal 414 and a zero crossing of the current in a motor winding as identified within the detected zero crossing signal 418. Accordingly, a phase, i.e., a timing of, a modulation signal 408a generated by the modulation profile look up table and processor 408 is adjustable.

In the start-up mode of operation, the phase adjustment may not be performed. However, in other embodiments, similar circuits can be used to also perform the phase adjustment during the start-up mode of operation.

A processor portion of the modulation profile look up table and processor 408 can automatically generate other modulation profiles 408b, 408c at other fixed phases, for example, the modulation profiles 244, 246 of FIG. 2, which can be at fixed phases relative to the modulation profile 408a, e.g., the modulation profile 242 of FIG. 2.

Exemplary circuits and methods to detect a zero current through motor windings are described below in conjunction with FIGS. 5-8. However, it should be appreciated that other methods can be used to detect a zero current passing through a motor winding.

Discussion below in conjunction with FIGS. 5, 5A, 6, 7 and 7A applies to both the exemplary normal mode of operation and to the start-up mode of operation. FIGS. 5, 5A, 6, 7, and 7A are used to describe exemplary means by which the current measure module 144 of FIG. 1 can detect a zero current in a motor winding. However, in other embodiments, other techniques can be used to detect zero current.

Figure 5:
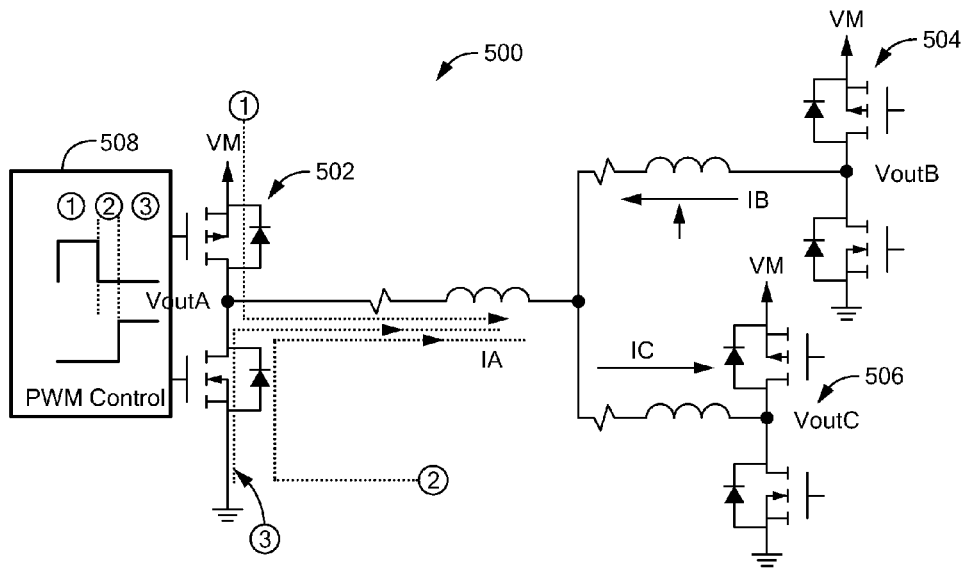
FIGS. 5 and 5A are block diagrams showing exemplary half bridge output stages of the exemplary motor control circuit of FIG. 1, and showing directions of motor winding current at different phases of operation.

Referring now to FIG. 5, three half bridge circuits 502, 504, 506 correspond to the three half bridge circuits 112/114, 116/118, 120/122 of FIG. 1 and are shown driving three motor windings. Currents through the half bridge circuit 502 and through one of the motor windings are indicated by dashed lines identified by circled numbers 1, 2, and 3. The currents 1, 2, and 3 are indicative of currents at different times through the half bridge circuit 502 during a positive polarity of a current signal in the motor winding, e.g., during positive parts of the current signal 262 of FIG. 2. The current 1 is indicative of the upper FET being on, the current 3 is indicative of the lower FET being on, and the current 2 is indicative of both FETS being turned off. It will be appreciated that the current 2 passes through an intrinsic diode of the lower FET, and thus, the voltage VoutA (see e.g., signal 124 of FIG. 1) achieves a voltage approximately 0.7 volts below ground beginning when the two FETs of the half bridge 502 are turned off and returns to ground voltage when the lower FET turns on. Thus, it will be appreciated that, by detecting the voltage VoutA going below ground and returning to ground, an actual zero current through the half bridge 502 and through the associated motor winding can be identified.

Figure 5A:
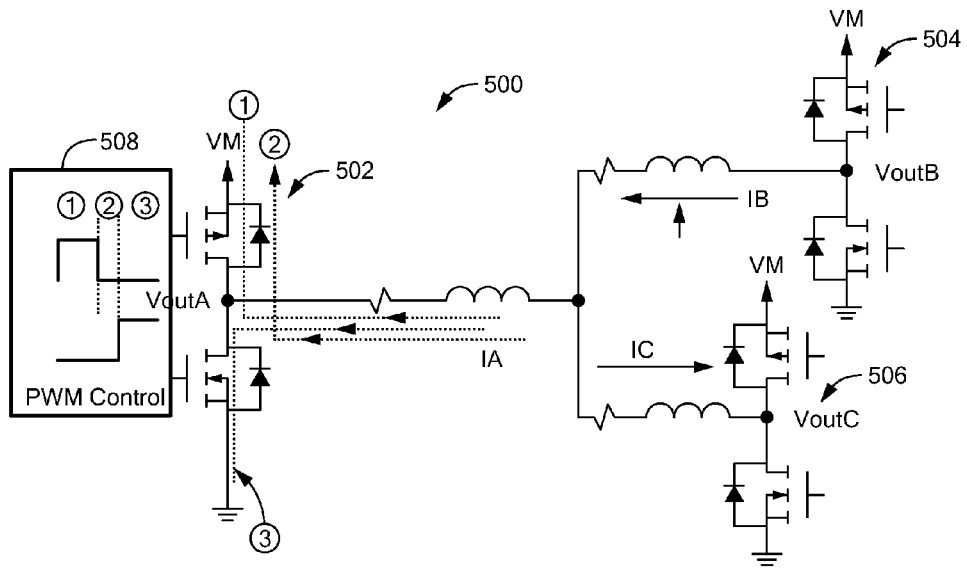

Referring now to FIG. 5A, in which like elements of FIG. 5 are shown having like reference designations, currents through the half bridge circuit 502 and through one of the motor windings are again indicated by dashed lines identified by circled numbers 1, 2, and 3. The currents 1, 2, and 3 are indicative of currents at different times through the half bridge circuit 502 during a negative polarity of a current signal in the motor winding, e.g., during negative parts of the current signal 262 of FIG. 2. The current 1 is indicative of the upper FET being on, the current 3 is indicative of the lower FET being on, and the current 2 is indicative of both FETS being turned off. It will be appreciated that the current 2 passes through an intrinsic diode of the upper FET, and thus, the voltage VoutA achieves a voltage approximately 0.7 volts above the voltage VM beginning when the two FETs of the half bridge 502 are turned off and returns to the voltage VM when the upper FET turns on Thus, it will be appreciated that, by detecting the voltage VoutA going above the voltage VM and returning to the voltage VM, an actual zero current through the half bridge 502 and through the associated motor winding can be identified.

Figure 6:
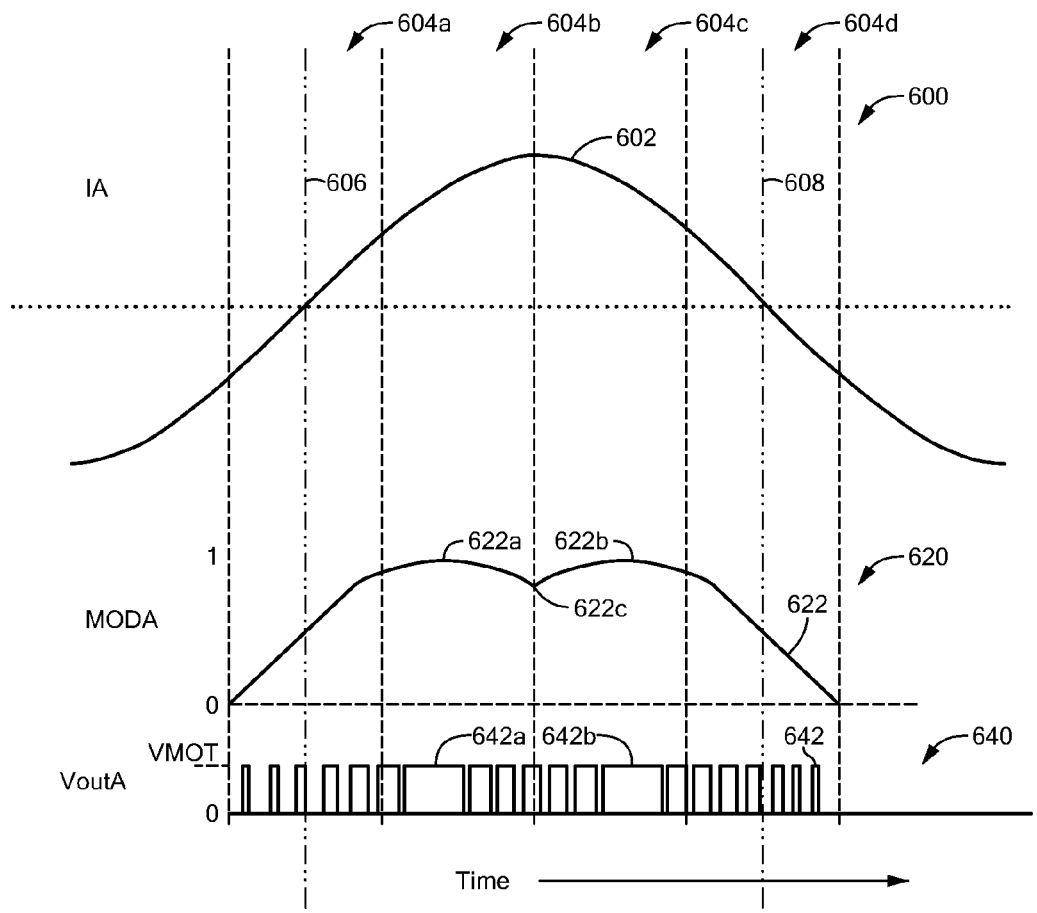
FIG. 6 is a graph showing waveforms associated with the motor winding, in particular, a sinusoidal current, a modulation waveform associated with a sinusoidal drive of the motor winding, and a pulse width modulated (PWM) signal that drives a motor in accordance with the modulation waveform.

Referring now to FIG. 6, a graph 600 has a horizontal axis with a scale in units of time in arbitrary units and a vertical axis with a scale in unit of current in arbitrary units. A graph 620 has a horizontal axis with a scale in units of time in arbitrary units and a vertical axis with a scale in unit of voltage in arbitrary units. A graph 640 has a horizontal axis with a scale in units of time in arbitrary units and a vertical axis with a scale in unit of voltage in arbitrary units.

A signal 602 is representative of a current signal in a motor winding A when a sinusoidal drive signal is used. The current signal 602 can be the same as or similar to the current signal 262 of FIG. 2. As described above, when a PWM drive signal is used, the current signal 602 can appear more complex, but the signal 602 is generally representative of an average current through the winding A. The current signal has zero crossings at time 606, 608.

A modulation signal 622 can be the same as or similar to the modulation signal 242 of FIG. 2. The modulation signal 622 can have six time periods or phases, of which four are shown 604a, 604b, 604c, 604d.

A PWM signal 642 can be generated, for example, by the PWM generator 108 of FIG. 1 in accordance with the modulation waveform 622 and can have times of high duty cycle 642a, 642b at times of peaks 622a, 622b of the modulation waveform 622 and times of lower duty cycle at times of other portions of the modulation waveform 622 in accordance with values of the modulation waveform 622. The PWM signal 642 can be the signal actually applied to the motor winding A 104a of the motor 104 of FIG. 1 for a sinusoidal drive.

Figure 7:
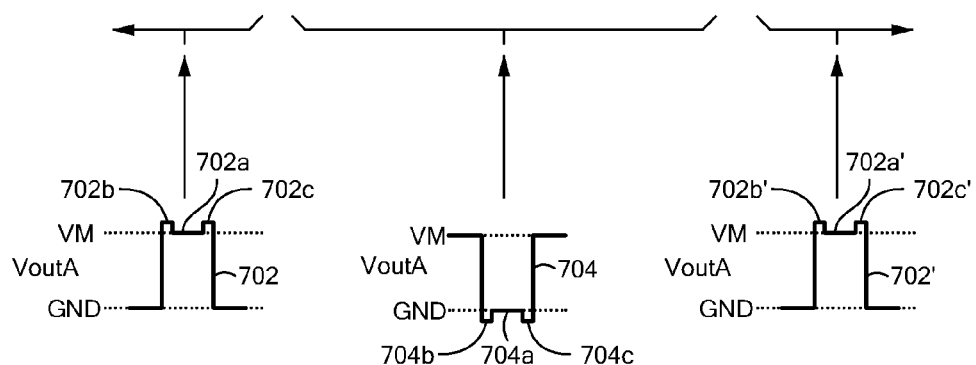
FIG. 7 is a pictorial showing details of positive and negative states of the PWM signal of FIG. 6.

Referring now to FIG. 7, PWM pulses 702, 702' are indicative of the PWM pulses 642 of FIG. 6 during negative polarity portions of the current signal 602. A PWM pulse 704 is indicative of the PWM pulses 642 of FIG. 6 during positive polarity portions of the current signal 602.

The PWM pulses 702, 702' have raised or transient portions 702b, 702c, 702b', 702c' and steady state portions 702a, 702a'. In accordance with the discussion above in conjunction with FIGS. 5 and 5A, it will be appreciated that, when both transistors, e.g., FETs, of a half bridge are turned off, a voltage VoutA appearing on the associated motor winding temporarily goes above the motor voltage VM, or below ground, depending upon a polarity of the current in the motor winding, i.e., a polarity of the current signal 602. It will also be appreciated that each major edge transition of the PWM signals 702, 704, 702' is preceded by a short time period during which both of the FETs are turned off, otherwise, both FETs might simultaneously turn on, resulting in a short circuit between the motor voltage VM and ground. Thus, when the two FETs are turned off, the transient signal portions 702b, 702c, 704b, 704c, 702b', 702c' result. The transient signal portions 702*b*, 702*c*, 704*b*, 704*c*, 702*b'*, 702*c'* can occur for a short time period, for example, for about five hundred nanoseconds.

It will be apparent that the direction of the transient voltage signal portions 702*b*, 702*c*, 704*b*, 704*c*, 702*b'*, 702*c'* change direction upon each occurrence of a zero crossing of the current signal 602, i.e., at times 606, 608. Thus, detection of changes in direction of the transient signal portions 702*b*, 702*c*, 704*b*, 704*c*, 702*b'*, 702*c'* can be used to identify a zero current in the associated motor winding.

Figure 7A:
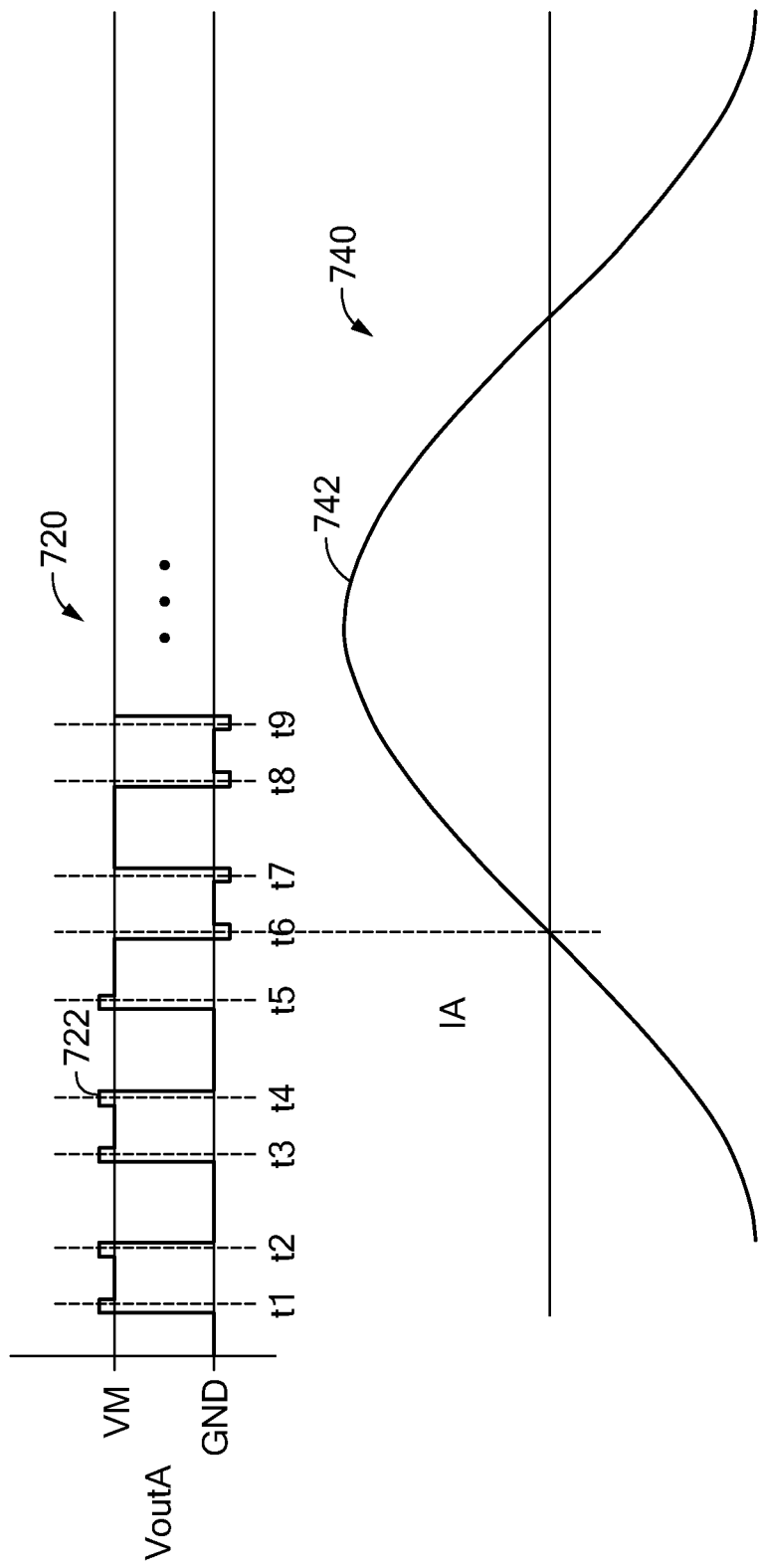
FIG. 7A is a graph showing a PWM drive signal applied to an electric motor, and showing a sinusoidal current associated with the PWM drive signal.

Referring now to FIG. 7A, a graph 720 has a horizontal axis with a scale in units of time in arbitrary units and a vertical axis with a scale in unit of voltage in arbitrary units. A graph 740 has a horizontal axis with a scale in units of time in arbitrary units and a vertical axis with a scale in units of current in arbitrary units.

A signal 722 is representative of the PWM signal 642 of FIG. 6, but showing transient signal portions like the transient portions 702*b*, 702*c*, 704*c*, 704*d*, 702*b'*, 702*c'* of FIG. 7. A signal 742 is the same as or similar to the current signal 602 of FIG. 6.

Times t1-t9 occur during the transient signal portions. From discussion above in conjunction with FIGS. 5 and 5A, it will be apparent that the transient signal portions occur when both FETs of an associated half bridge circuit driving a motor winding are turned off.

For reasons described above in conjunction with FIGS. 5, 5A, and 7, at the time t6, the transient signal portion changes orientation coincident or nearly coincident with a zero crossing of the current signal 742. Thus, the change of orientation of the transient signal portions can be used to detect a zero current crossing in a motor winding. In particular, at the times t1-t5, the transient signal portions extend above the motor voltage VM. Conversely, at the times t6-t9, the transient signal portions extend below ground. Another change or orientation (not shown) of the transient signal portions occurs at a next zero crossing of the current signal 742, and can also be used to detect the next zero crossing.

In some embodiments, a circuit (see, e.g., comparators 808, 810 shown below in FIG. 8) can be operable to sample the signal VoutA 722 to detect the signal transient portions only at or near to the times t1-t9, and also at other similar times that follow. The times t1-t9 and similar times that follow are known, since both FETs are momentarily turned off at those times. In other embodiments, the signal 722 can be continually sampled to detect the transient signal portions.

In some embodiments, the changes of orientations of the transient signal portions can be detected with two comparators. Both zero crossings of the current signal 742 can be detected. However, in other embodiments, one comparator can be used to detect the presence or absence of transient signal portions that either extend upward or that extend downward. Still, both zero crossings of the current signal 742 can be detected with one comparator.

Figure 8:
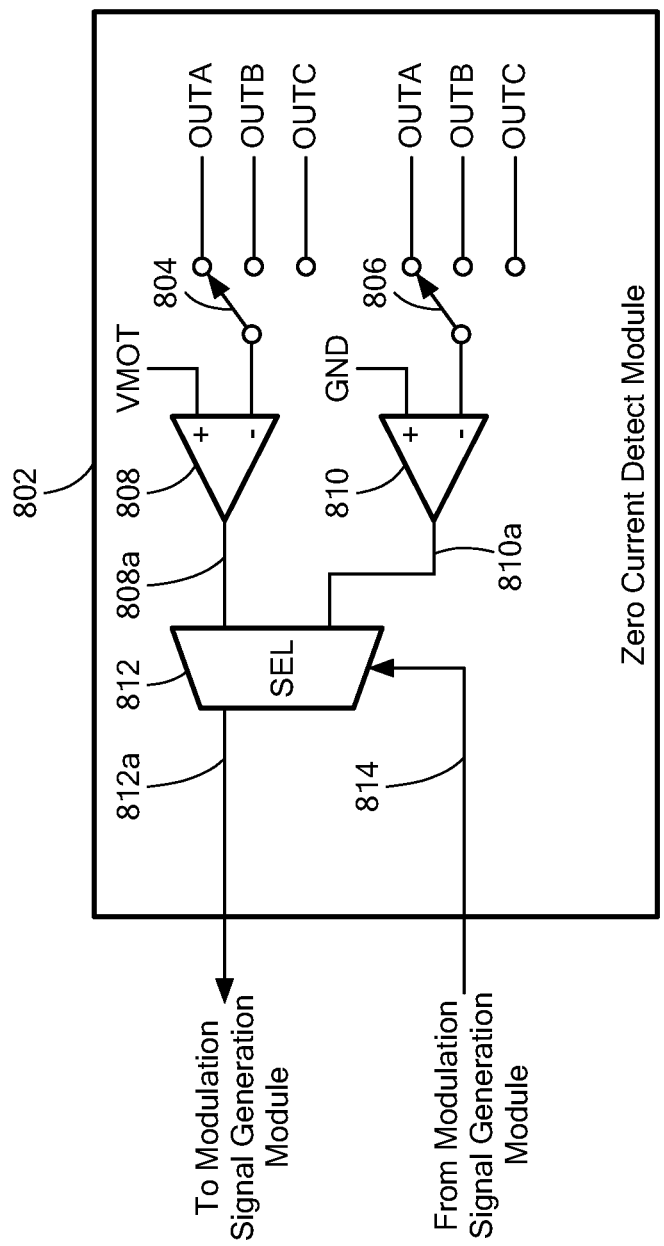
FIG. 8 is a block diagram of an exemplary current measurement module that can be used as the current measurement module of FIG. 1.

Referring now to FIG. 8, a zero current detection module 802 can be the same as or similar to the current measurement module 144 of FIG. 1.

The zero current detection module 802 can include a first comparator 808 coupled to the three motor windings via a selectable switch 804. The zero current detection module 802 can also include a second comparator 810 coupled to the three motor windings via a selectable switch 806. The first comparator 808 can be coupled to receive a reference voltage equal to or close to the motor voltage VM. The second comparator 810 can be coupled to receive a reference voltage equal to or close to ground.

The first comparator 808 is configured to generate an output signal 808*a* indicative of voltage on a selected motor winding going above the motor voltage. The second comparator 810 is configured to generate an output signal 810*a* indicative of voltage on a selected motor winding going below ground. Thus, in operation, the first comparator 808 operable to detect the positive transient signal portions 702*b*, 702*c*, 702*b'*, 702*c'* of the PWM signal of FIG. 7 associated with a sinusoidal motor drive. Similarly, in operation, the second comparator 810 is operable to detect the negative transient signal portions 704*b*, 704*c* of the PWM signal of FIG. 7 associated with a sinusoidal motor drive. As described above, edges of these signal portions can be used to identify a zero current crossing in an associated motor winding.

The zero current detection module 802 can also include a multiplexer 812 coupled to receive the output signal 808*a*, 810*a* and configured to generate and output single 812*a* representative of a selected one of the output signals 808*a*, 810*a*.

The multiplexer 812 can be coupled to receive a control signal 814 from the modulation signal generation module 146, i.e., a control signal 146*d* of FIG. 1. The switches 804, 806 can be coupled to receive other control signals (not shown) from the modulation signal generation module 146.

The modulation signal generation module 146 can use a variety of types of logic to identify a zero current crossing in one or more of the motor windings. For example, in accordance with the discussion above in conjunction with FIGS. 7 and 7A, for a PWM sinusoidal motor drive signal, the output signals 808*a*, 810*a* can be used to identify a change in direction of the transient signal portions 702*b*, 702*c*, 704*b*, 704*c*, 702*b'*, 702*c'* of the PWM signal 642. Essentially, the multiplexer 812 can switch to view the other comparator whenever detection is made of a particular direction of the transient signal portions.

In some embodiments, the switches are not used and only one motor winding is used to provide signals to the comparators 808, 810. In some embodiments, only one comparator is used and the multiplexer 812 is not necessary. A variety of different types of logic can be used by the modulation signal generation module 146 to identify a zero crossing of a current through a motor winding by using the above described technique of detecting when a voltage on a motor winding goes above the motor voltage VM and/or below ground.

Figure 9:
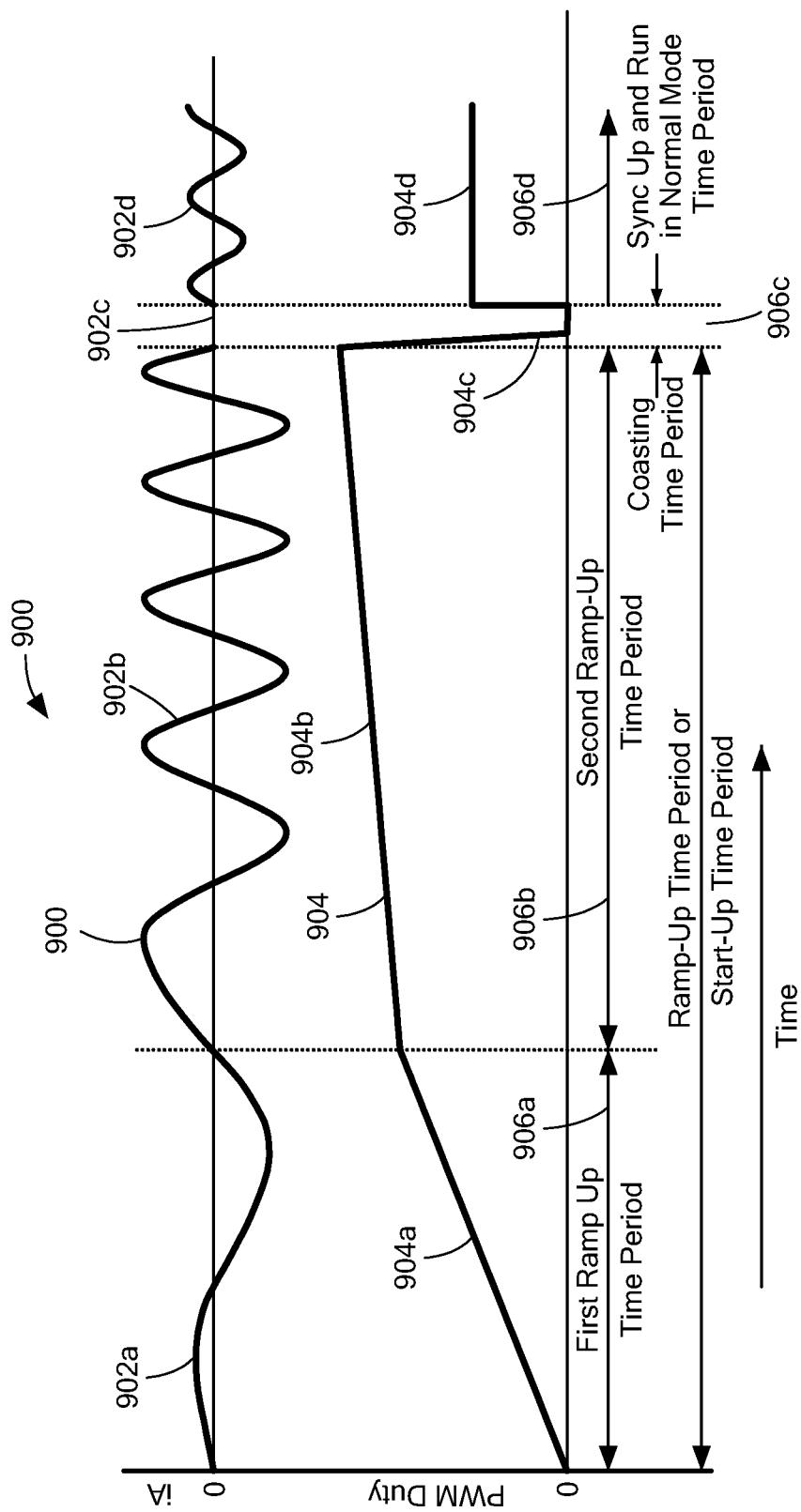
FIG. 9 is a graph showing characteristics of a start-up mode demand signal and characteristics of current in one of the motor windings in accordance with a first ramp-up time period, second ramp-up time period, coasting time period, and a normal mode time period, wherein the first and second ramp-up time periods together correspond to a start-up time period and to a start-up mode of operation.

Referring now to FIG. 9, a graph 900 has a horizontal axis in units of time in arbitrary units and a vertical axis with both units of pulse width modulation (PWM) duty cycle in arbitrary units and in units of current in arbitrary units. The graph 900 is representative of the above-described start-up mode of operation followed by the above-described exemplary normal mode of operation.

On the time axis, a first ramp-up time period 906*a* and a second ramp-up time period 906*b* are indicative of the above-described start-up mode of operation. Taken together, the first ramp-up time period and the second ramp-up time period are referred to herein as either a ramp-up time period or a start-up time period.

A coasting time period 906*b* is indicative of a transition time between the start of mode of operation and the above-described exemplary normal mode of operation. A normal mode time period 906*d* is indicative of the normal mode of operation.

A curve 904 is indicative of a peak pulse width modulation duty cycle, i.e., is indicative of values of the start-up mode demand signal 148*a* of FIG. 1, for example at peaks of the modulation waveforms 242, 244, 246 of FIG. 2. As described above, pulse width duty cycle is related to amplitudes of the drive signal 124, 126, 128 (FIG. 1) applied to the motor 104.

During the first ramp-up time period 904a, the peak PWM duty cycle (the start-up mode demand signal 148b) increases rapidly from a low duty cycle, for example, zero percent peak duty cycle or two percent peak duty cycle. During the second ramp-up time period 906b, the peak PWM duty cycle (the start-up mode demand signal 148b) increases less rapidly.

While not shown, during the first ramp-up time period 906a, as will become apparent from discussion below in conjunction with FIG. 12, the start-up mode theta signal 148c of FIG. 1 can also increase, resulting in an increase in a frequency of the modulation waveforms, i.e., modulation envelope a, 146a, 146b, 146c of FIG. 1, exemplary versions of which are shown as waveforms 242, 244, 246 of FIG. 2. An increase in frequency of the modulation waveforms is equivalent to an increase in rate of the modulation waveforms. Also, while not shown, during the second ramp-up time period 906b, the start-up mode theta signal 148c of FIG. 1 can increase, again resulting in an increase in the frequency of the modulation waveforms.

In some embodiments, the first ramp-up time period 906a is dominated by an increase in the peak PWM duty cycle. In some embodiments, the second ramp-up time period 906b is dominated by an increase in frequency of the modulation waveforms.

Increases in the peak PWM duty cycle during the first ramp-up time period 906a and during the second ramp-up time period 906b are shown to increase linearly and continuously. In other embodiments, one of or both of the increases can be nonlinear and continuous. In other embodiments, one of or both of the increases can be discontinuous.

In some other embodiments, there is only one ramp-up time period during the start-up mode of operation, and during the one ramp-up time period, the peak PWM duty cycle can increase linearly and continuously in some embodiments, nonlinearly and continuously in other embodiments, and discontinuously in still other embodiments. Similarly, during the one ramp-up time period, the frequency of the modulation waveforms can increase linearly and continuously in some embodiments, nonlinearly and continuously other embodiments, and discontinuously in still other embodiments.

During the coasting time period 906c, the peak PWM duty cycle is brought to zero, which is indicative of the drive signals 124, 126, 128 of FIG. 1 being turned off. As described above, the back EMF signal on a motor winding, generated when the motor is rotating, can be observed when there are no drive signals applied to the motor. Thus, the coasting time period 904c can have a time duration beginning at the time of stopping the drive signals and ending when a particular back EMF signal is detected. This is further described below in conjunction with FIG. 10.

After the coasting time period, an intermediate peak PWM duty cycle 904d is applied to the motor and the motor operates in the normal mode of operation thereafter.

A signal 902 is representative of current flowing through one of the motor windings, for example motor winding A 104a of FIG. 1. During the first ramp-up time period, a portion 902a of the current signal 902 increases primarily in amplitude, and less so in frequency. During the second ramp-up time period, a portion 902b of the current signal 902 increases primarily in frequency, and less so in amplitude. During the coasting time period, a portion 902c of the current signal 902 is representative of a zero current in the motor winding. During the normal mode time period, a portion 902d of the current signal 902 is representative of the normal mode of operation.

It can be seen that, at the end of the second ramp-up time period, the drive signal to the motor winding that results in the current signal 902 is stopped and the current signal 902 goes to zero current. Similarly, at the beginning of the normal mode time period, the current signal 902 begins at a phase such that the current starts at zero.

The coasting time period is described more fully below in conjunction with FIG. 10.

Figure 10:
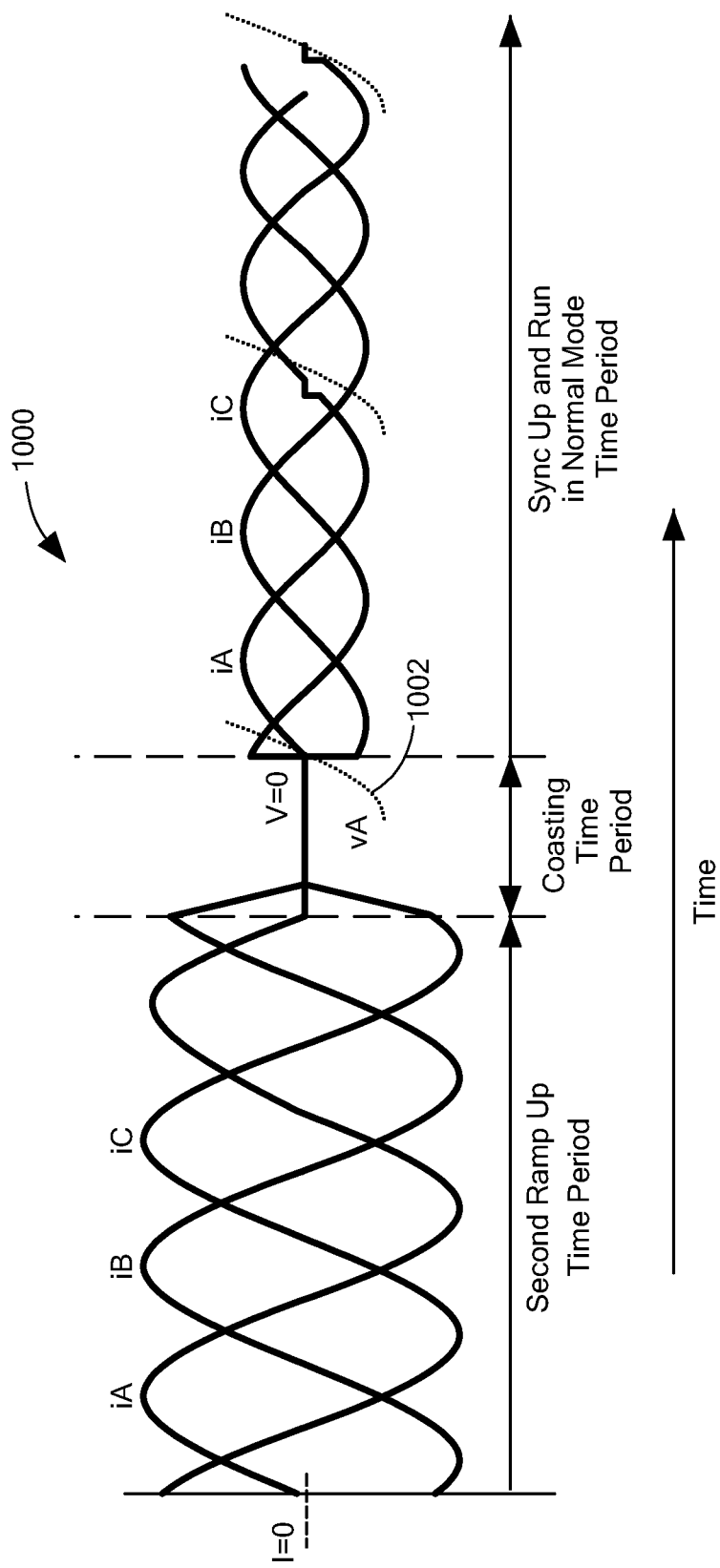
FIG. 10 is another graph showing characteristics of three currents corresponding to three motor windings in the second ramp-up time period, in the coasting time period, and in the normal mode time period.

Referring now to FIG. 10, signals 1000 are shown with a horizontal time scale in arbitrary units. A vertical scale is in units of current in arbitrary units.

A second ramp-up time period can be the same as or similar to the second ramp-up time period of FIG. 9. A coasting time period shown in FIG. 10 can be the same as or similar to the coasting time period shown above in conjunction with FIG. 9. A normal mode time period shown in FIG. 10 can be the same as or similar to the normal mode time period shown above in conjunction with FIG. 9.

Here, the currents in all three of the motor windings of the motor 104 of FIG. 1 are shown at the end of the second ramp-up time period. As described above in conjunction with FIG. 9, at the end of the second ramp-up time period, i.e., at the beginning of the coasting time period, as soon as the current iA in the winding A 104a is zero, all three motor drive signals are stopped, in which case, during the coasting time period, the current in winding A stays at zero and the currents in the other two windings rapidly approach zero.

In operation, at some time during the coasting time period, the back EMF signal 1002 on the winding A passes through zero volts. Zero crossing of the back EMF is indicative of a reference rotational position of the rotation of the motor. When the zero voltage is detected on the winding A, all three motor drive signals are again started resulting in the current waveforms shown during the normal mode of operation. In particular, it should be noted that, with this arrangement, the current on winding A (and the currents at all the other windings) start-up in the normal mode of operation at the same phases that they were in at the end of the ramp-up time period. In this way, the motor achieves the normal mode of operation without a phase discontinuity in the signals that drive the motor.

Figure 11:
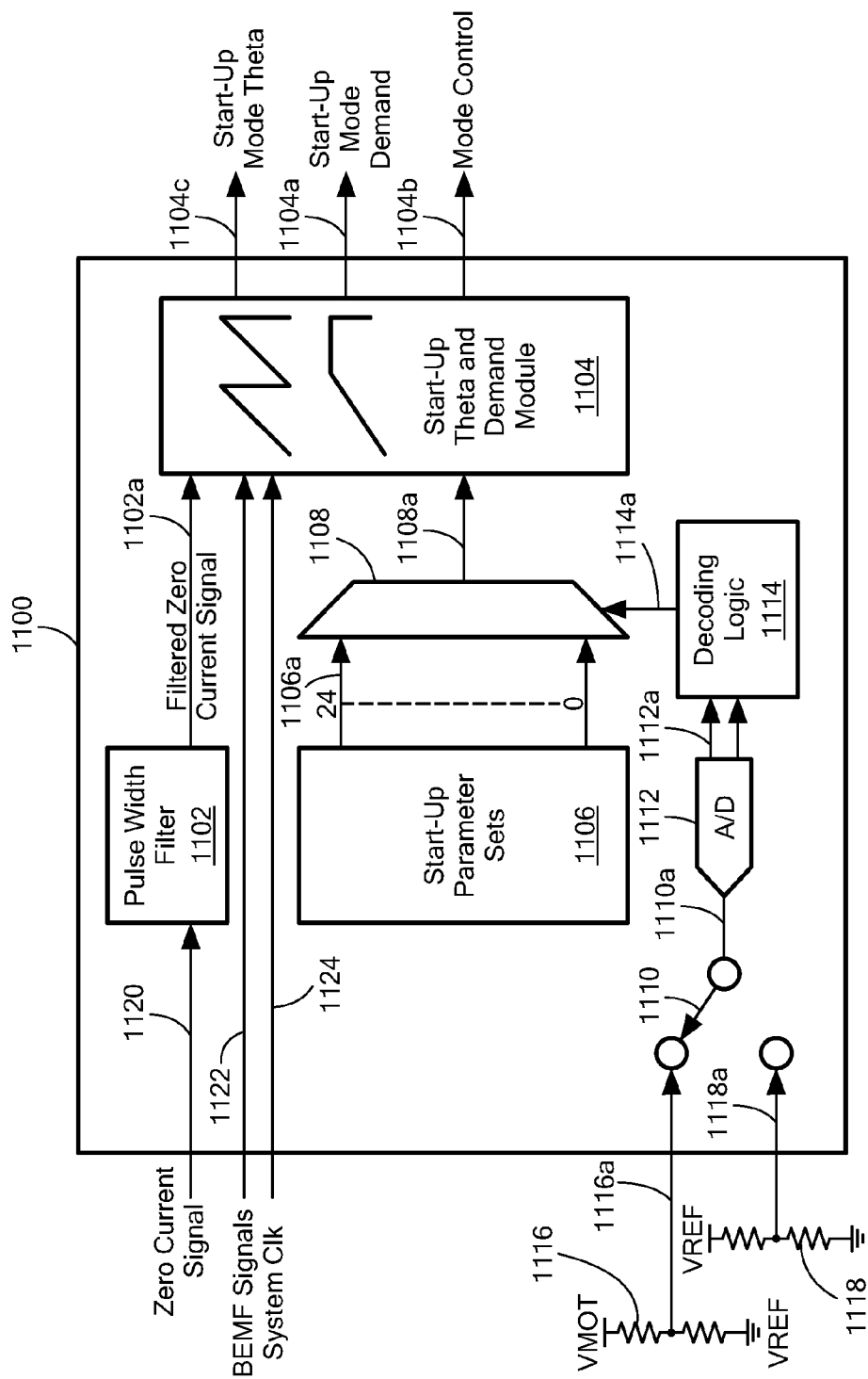
FIG. 11 is a block diagram of an exemplary start-up control module that can be used as a start-up control module of FIG. 1, the start-up control module having retained therein a plurality of sets of start-up parameter values.

Referring now to FIG. 11, a start-up control module 1100 can be the same as or similar to the start-up control module 148 of FIG. 1. The start-up control module 1100 essentially controls operation of the motor control circuit 102 of FIG. 1 during the first and second ramp-up time periods and the coasting time period of FIGS. 9 and 10.

The start-up control module 1100 can be coupled to receive a zero current signal 1120. The zero current signal 1120 can be the same as or similar to the detected zero current signal 144a of FIG. 1.

The start-up control module 1100 can also be coupled to receive one or more back EMF signals 1122. The back EMF signals can be this same as or similar to the back EMF signals 150 of FIG. 1.

The start-up control module 1100 can also be coupled to receive a system clock signal 1124.

The start-up control module 1100 can also be coupled to receive a selection signal 1118a from a resistor divider 1118. The resistor divider 1118 can be the same as or similar to the resistor divider 152 of FIG. 1.

The start-up control module 1100 can also be coupled to receive a motor voltage signal 1116a from a resistor divider 1116. The resistor divider 1116 can be the same as or similar to the resistor divider 154 of FIG. 1.

The start-up control module 1100 is configured to generate a start-up mode theta signal 1104c. The start-up mode theta signal 1104c can be the same as or similar to the start-up mode theta signal 148c of FIG. 1.

The start-up control module 1100 is also configured to generate a start-up mode demand signal 1104a. The start-up mode demand signal 1104a can be the same as or similar to the start-up mode demand signal 148a of FIG. 1.

The start-up control module 1100 is also configured to generate a mode control signal 1104b. The mode control signal 1104b can be the same as or similar to the control signal 148b of FIG. 1.

The start-up control module 1100 can include a switch 1110 is configured to toggle back and forth between the motor voltage signal 1116a and the selection signal 1118a. An analog-to-digital converter 1112 is coupled to receive an output signal from the switch 1110. The analog-to-digital converter 1112 is configured to generate a digital output signal 1112a representative of at least one of the motor voltage signal 1116a or the selection signal 1118a.

The start-up control module 1100 can include decoding logic 1114 coupled to receive the digital signal 1112a. In response to the digital signal 1112a, the decoding logic 1114 can generate a control signal 1114a representative of a selected one of a plurality of states. It will become apparent from discussion below, that the selected one of the plurality of states is representative of a selected one of a plurality of sets of parameter values that determine characteristics of drive signals applied to the motor 104 of FIG. 1 during the start-up mode of operation. Thus, one of the plurality of sets of parameter values is selected in accordance with at least one of the selection signal 1118a or the motor voltage signal 1116a, and therefore, by a user.

The plurality of sets of parameter values 1106 can be retained within or proximate to the start-up control module 1100. The parameter values 1106 can be retained in a variety of ways. In some embodiments, the sets of parameter values 1106 are retained in a storage device, for example, a ROM, a PROM, or an EEPROM. However, in order to minimize use of silicon surface area in fabrication of the motor control circuit 102 of FIG. 1, in some embodiments, the parameter values 1106 can merely be hard wired bits, wherein all of the bits are available at the same time.

All of the parameter values can be received by a multiplexer 1108. In response to the control signal 1114a, the multiplexer 1108 can present a selected one of the plurality of sets of parameter values as a signal 1108a, which can be either a serial digital signal or a parallel digital signal.

A start-up theta and demand module 1104 can include a theta ramp generator similar to the theta ramp generator 404 of FIG. 4. In response to the selected one of the plurality of sets of parameter values within the signal 1108a, the start-up theta and demand module 1104 can generate the signals 1104a, 1104b, 1104c.

The start-up control module 1100 can include a pulse width filter 1102 coupled to receive the zero current signal 1120. The pulse width filter 1102 can be operable to remove very short pulses (e.g., transient noise pulses) to provide a more clean zero current signal 1102a The back EMF signal 1122 is used by the start-up theta and demand module 1104 for the synchronization process at the end of the coasting time period described above in conjunction with FIG. 10.

The zero current signal 1120 is used by the start-up theta and demand module 1104 to identify the zero current at the end of the ramp-up time period, i.e., the end of the start-up mode of operation, represented in FIG. 10.

Referring now to FIG. 12, a table shows ten exemplary parameters that can be used during the start-up mode of operation, and in particular, during a start-up mode of operation that includes both the first and second ramp-up time periods described above in conjunction with FIG. 9. While particular parameters are shown it should be recognized that other parameters can be used without departing from the intent, including more than ten parameters or fewer than ten parameters. Definitions of the various exemplary parameters are listed below.

fixedIniDutyIn—controls the initial peak PWM duty cycle during first amp up time period alignDutyIncrTime—controls the peak PWM duty cycle increment time during the first ramp-up time period alignDutyIncr—controls the peak PWM duty cycle increment during the first ramp-up time period alignThetaIncrTime—control the start-up mode theta increment time during the first ramp-up time period iniRampDuty—controls the initial peak PWM duty cycle during the second ramp-up time period dutyIncr—controls the peak PWM duty cycle increment amount during the second ramp-up time period freqUpdateTime—controls the ramp-up frequency (of modulation waveforms) changing time during the second d ramp-up time period iniFreqSel—controls the initial ramp-up frequency (of the modulation waveforms) during the second ramp-up time period noOfFreq—controls the total number of frequencies (of modulation waveforms) within the second ramp-up time period iniDutyAfterCoast—control the peak PWM duty cycle at end of the coasting time period Exemplary numbers of bits are shown for each parameter, however, in other embodiments, other numbers of bits can be used.

Twenty four exemplary sets of parameter values are shown. Only a first set of specific exemplary parameter values is shown due to the characteristic that the specific parameter values in each set of values can vary greatly depending upon the types of motors to which the motor control circuit is applied.

As described above, one of the sets of parameter values (here, one set from among exemplary Set 1 to exemplary Set 24) is selected in accordance with the motor voltage signal 1116a and/or the selection signal 1118a of FIG. 11. Thus, the selection can be made by a user by selection of the resistor divider 1118 of FIG. 11 in accordance with a type of motor being driven by the motor control circuit 102 of FIG. 1 and in accordance with a load presented to the motor.

Some parameter values can be fixed and the same in each one of the columns of FIG. 12, however, in other embodiments, none of the values are fixed. While particular values are shown in the Set 1 column of FIG. 12, other values could also be used. Useful ranges of parameter values for the various columns of FIG. 12 are listed below:

fixedIniDutyIn—0% to 10%
alignDutyIncrTime—1 ms to 50 ms
alignDutyIncr—0.1% to 5%
alignThetaIncrTime—1 ms to 50 ms
iniRampDuty—5% to 50%
dutyIncr—0.1% to 10%
freqUpdateTime—10 ms to 500 ms
iniFreqSel—0.5 HZ to 20 Hz
noOfFreq—1 to 100
iniDutyAfterCoast—5% to 50%

Referring now to FIG. 13, a chart shows exemplary logic by which the start-up control module of FIG. 11 can use that the motor voltage signal 1116a and the selection signal 1118a of FIG. 11 can be combined in order to select one of the twenty four sets of parameter values listed in FIG. 12. The listed selection values 0-15 correspond to arbitrary voltage values of the selection signal 152a of FIG. 1. Each selection value can be determined in accordance with an arbitrary range of voltages, for example within plus or minus twenty percent of a respective voltage value.

While the chart of FIG. 13 is representative of a particular logic used by the decoding logic module 1114 of FIG. 11, it should be recognized that any number of other logics could be used to combine the motor voltage signal and the selection signal.

In some embodiments, the motor voltage signal 1116a is not used at all, in which case, there is a one-to-one mapping between each selection value and a set of parameter values. Thus, there can be only sixteen sets of parameter values.

While twenty-four sets of parameter values are shown and described above in conjunction with FIG. 12, and while sixteen-sets of parameter values are described above, in alternate embodiments, there can be any number of sets of parameter values, so long as there are at least two sets of parameter values.

Figure 14:
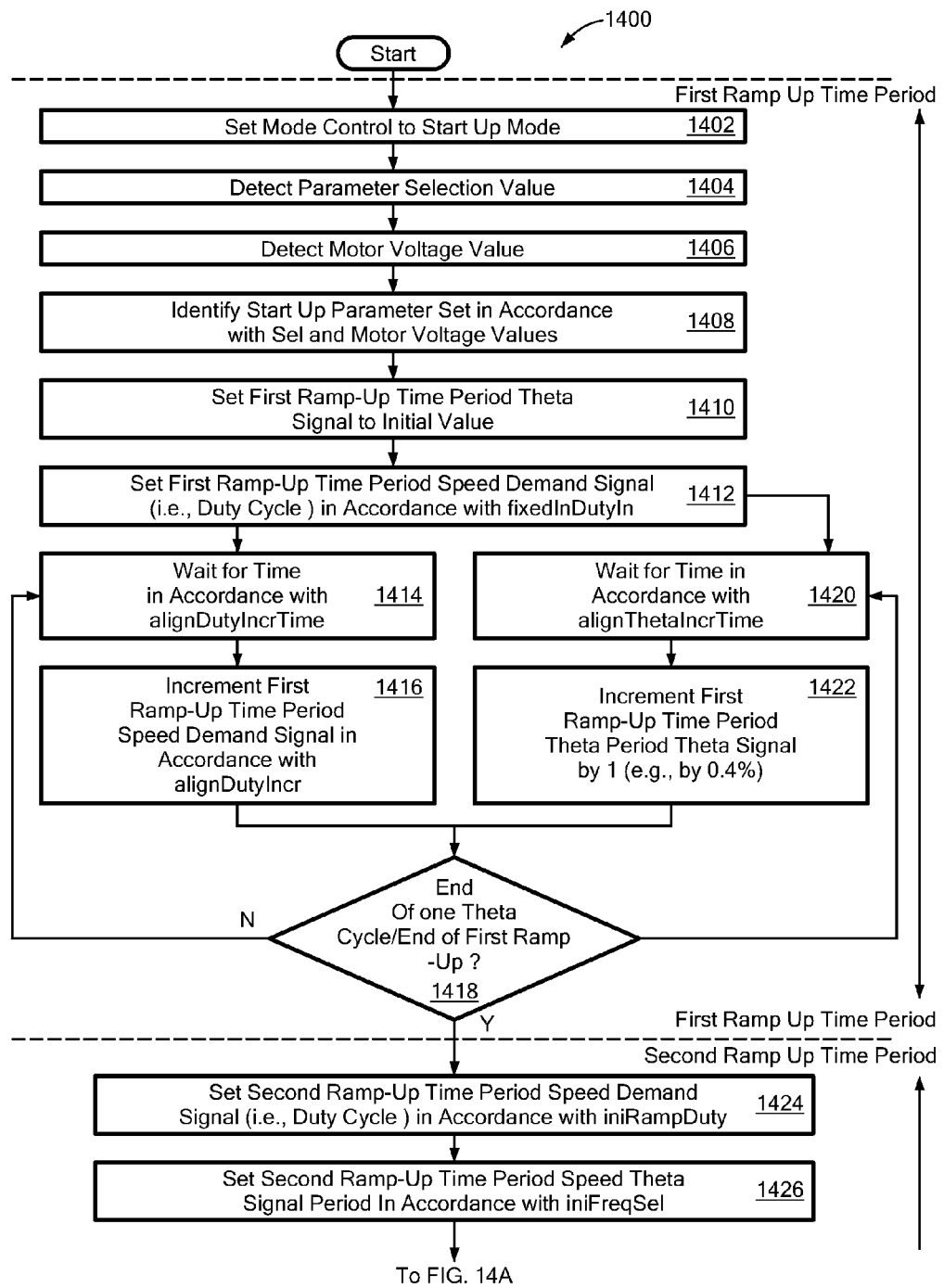
FIGS. 14 and 14A together form a flowchart showing a process that can be used by the start-up control module of FIG. 1 in order to start a motor rotating.

It should be appreciated that FIG. 14 shows a flowchart corresponding to the below contemplated technique which would be implemented in a motor control circuit 102 (FIG. 1). Rectangular elements (typified by element 1402 in FIG. 14), herein denoted "processing blocks," represent computer software instructions or groups of instructions. Diamond shaped elements (typified by element 1418 in FIG. 14), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 14A:
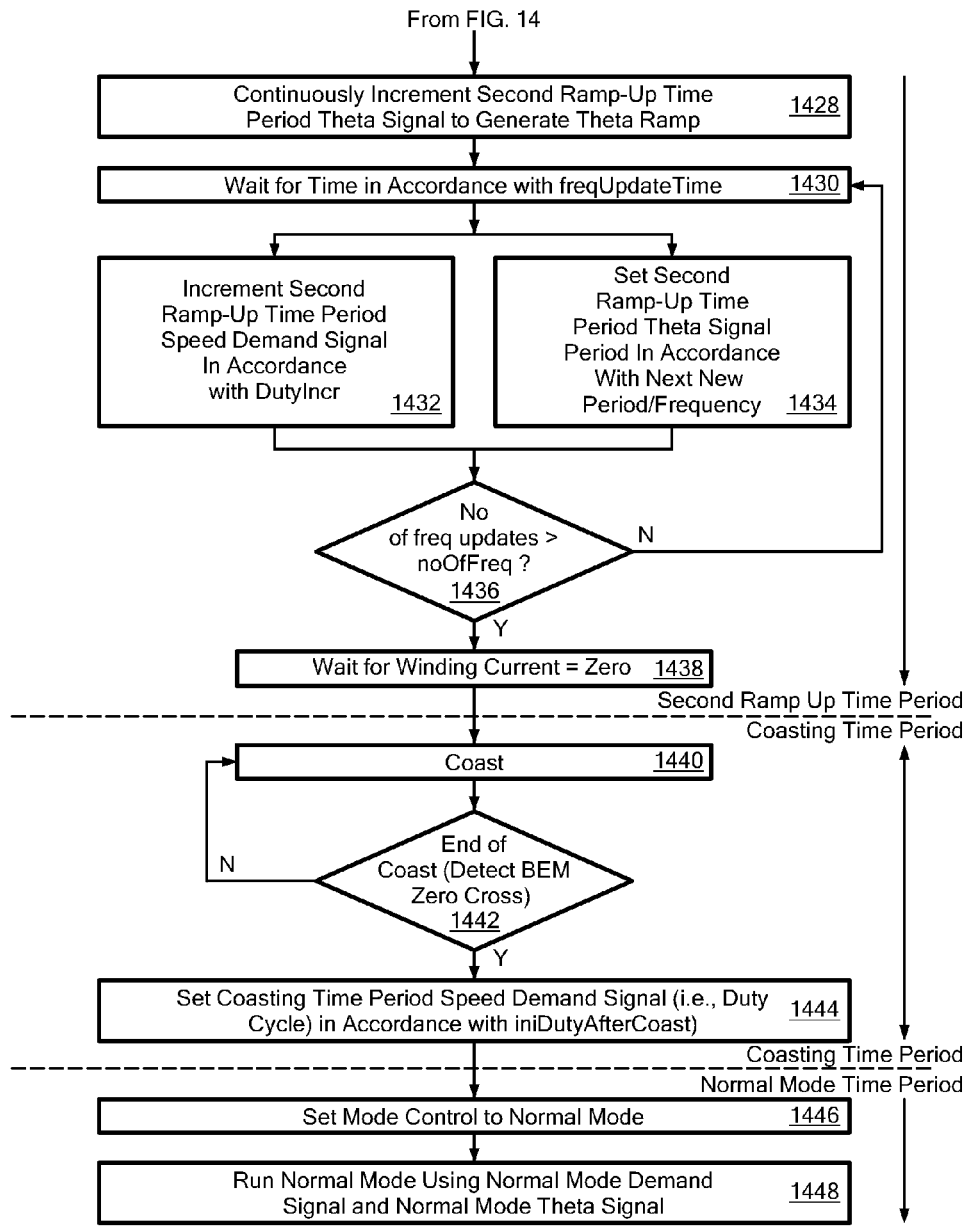

Referring now to FIGS. 14 and 14A taken together, a method 1400 is indicative of an exemplary way that the various parameters listed above can be used during the start-up mode of operation in the motor control circuit 102 of FIG. 1, and, in particular, during a start-up mode of operation that has the first ramp-up time period and the second ramp-up time period shown and described above in conjunction with FIG. 9. However, it will be understood that other methods can be used to provide the start-up mode of operation using at least the selection signal 152a of FIG. 1, including, as described above, a start-up mode of operation that has only one ramp-up time period.

Reference is made throughout the discussion of FIGS. 14 and 14A to hardware elements of FIG. 1. It is assumed that the method 1400 begins at a time when an electric motor, to which the motor control circuit 102 is coupled, is not rotating.

It will be recognized from discussion below that blocks 1402-1418 correspond to functions of the start-up control module 148 during the first ramp-up time period described above in conjunction with FIG. 9. Blocks 1424-1438 correspond to functions of the start-up control module 148 during the second ramp-up time period described above in conjunction with FIG. 9. Blocks 1440-1444 correspondents functions of the start-up control module 148 during the coasting time period described above in conjunction with FIG. 9. Blocks 1446-1448 correspond to functions of the start-up control module 148 and the overall motor control circuit 102 during the normal mode of operation described above in conjunction with FIG. 9 and various other ones of the figures.

The exemplary method 1400 begins at step 1402, where the start-up control module 148 of FIG. 1 sets the mode control signal 148b to a state indicative of a start-up mode of operation.

At block 1404, the start-up control module 148 detects a value of the selection signal 152a, e.g., an analog voltage value of the selection signal 152a.

At block 1406, the start-up control module 148 detects a value of the motor voltage signal 154a, e.g., an analog voltage value of the motor voltage signal 154a.

At block 1408, the start-up control module 148 identifies a start-up parameter set, i.e., one of the columns of FIG. 12, in accordance with the discussion above in conjunction with FIGS. 11, 12, and 13. In some embodiments, the start-up control module 148 uses both the selection signal 152a and the motor voltage signal 154a to identify a set of parameter values from a plurality of sets of parameter values as described above in conjunction with FIGS. 12 and 13. However, in some other embodiments, as described above, the start-up motor control module 148 does not use the motor voltage signal 154a, and the determination of which set of parameter values to use is made only in accordance with the selection signal 152a.

At block 1410, the start-up control module 148 sets the first ramp-up time period theta signal, (i.e., start-up mode theta signal 148c during the first ramp-up time period) to an initial value, for example, to be equal to a parameter value of alignThetaIncrTime*256.

At block 1412, the start-up control module 148 sets the first ramp-up time period speed demand signal (i.e., start-up mode demand signal 148a during the first ramp-up time period, i.e. the peak duty cycle of PWM waveforms) in accordance with the parameter fixedIniDutyIn of the selected parameter value set of FIGS. 12 and 13.

Values set at blocks 1410 and 1412 cause motor drive signals 124, 126, 128 to begin driving the motor 104.

At block 1414, the motor control circuit 102 waits (while generating the motor drive signals 124, 126, 128) in accordance with the parameter alignDutyIncrTime of the selected parameter value set.

At block 1416, the start-up control module 148 increments the first ramp-up time period demand signal in accordance with the parameter alignDutyIncr of the selected parameter value set.

In parallel with blocks 1414 and 1416, at block 1420, the motor control circuit 102 waits (while generating the motor drive signals 124, 126, 128) in accordance with the parameter alignThetaIncrTime of the selected parameter value set. At block 1422, the start-up control module 148 increments the first ramp-up time period theta signal (i.e., start-up mode theta signal 148c during the first ramp-up time period), for example, by one count value (e.g., for embodiments in which the theta signal counts from zero to two hundred fifty-five). In other embodiments, a value greater than one count value can be used.

At block 1418 the start-up control module 148 detects whether an end of the first ramp-up time period has occurred.

In some embodiments, the end of the first ramp-up time period (see, e.g., FIG. 9) can be detected in accordance with an end of one cycle of the start-up mode theta signal 148c of FIG. 1. It will be understood from discussion above that the start-up mode theta signal 148c is comprised of values that ramp-up in value. The end of a theta cycle can constitute a last value of the ramp-up of the theta signal 148c.

In other embodiments, an end of the first ramp-up time period can be detected in accordance with any number of cycles of the start-up mode theta signal 148c, where the start-up mode theta signal 148c ramps up then resets to an initial value and ramps up again in each cycle.

If an end of the first ramp-up time period is detected, then the process proceeds to block 1424. At block 1424, the second ramp-up time period begins (see, e.g., FIG. 9)

At block 1424, the start-up control module 148 sets the first ramp-up time period speed demand signal (i.e., start-up mode demand signal 148a during the second ramp-up time period, i.e. the peak duty cycle of PWM waveforms) in accordance with the parameter iniRampDuty of the selected parameter value set of FIGS. 12 and 13.

At block 1426, the start-up control module 148 sets the second ramp-up time period theta signal, (i.e., start-up mode theta signal 148c at the start of the second ramp-up time period) in accordance with the parameter iniFreqSel of the selected parameter value set of FIGS. 12 and 13.

At block 1428, (FIG. 14A) the start-up control module 148 continuously ramps the second ramp-up time period theta signal (i.e., the start-up mode theta signal 148c) in order to generate periodic and repetitive cycles of a ramping signal. This results in the drive signals 124, 126, 128 having a plurality of cycles.

At block 1430, the motor control circuit 102, and the start-up control module 148 in particular, continues to generate cycles of the start-up mode theta signal 148c (while generating a corresponding cycles of the motor drive signals 124, 126, 128) until a time in accordance with the parameter freqUpdateTime of the selected parameter value set of FIGS. 12 and 13.

At block 1432, the start-up control module 148 increments the second ramp-up time period demand signal (i.e., the start-up mode demand signal 148a) in accordance with the parameter dutyIncr of the selected parameter value set of FIGS. 12 and 13.

In parallel block with 1432, at block 1434, the start-up control module 148 sets the second ramp-up time period theta signal (i.e., the start-up mode theta signal 148c) to a new rate (i.e., frequency) in accordance with a frequency increment, for example, a three Hz increment. However, the increment can be any value in a range from about one Hz to about 100 Hz. In some embodiments, this value is selected as another value (not shown) within a set of selected parameter values from FIG. 12.

At block 1444, the start-up control module 148 identifies if the number of frequency updates at block 1446 is above a value in accordance with the parameter NoOfFreq of the selected parameter value set of FIGS. 12 and 13.

If the number of frequency updates has been exceeded, then the process proceeds to block 1438. If the number of frequency updates has not been exceeded, then the process returns to block 1430.

At block 1438 the start-up control module 148 waits for the current in a selected one or more of the windings of the motor 104 to achieve a current approximately equal to zero. The time at which the current reaches zero corresponds to the beginning of the coasting time shown in FIG. 9.

At block 1440, during the coasting time period of FIG. 6, the start-up control module 148 shuts down the start-up mode command signal 148a and the start-up mode theta signal 148c in order to shut down the drive signals 124, 126, 128 to the motor 104 to enter the coasting time period of FIG. 9.

At block 1442, the start-up control module 148 uses the back EMF signal 150, in accordance with the discussion above in conjunction with FIG. 10, in order to identify an end of the coasting time period. At block 1442, if the end of the coasting time period is not yet detected, then the process returns to block 1440 in a loop. At block 1442, if the end of the coasting time period is detected, then the process proceeds to block 1444.

At block 1444, the start-up control module 148 sets the coasting time period speed demand signal (i.e., the start-up mode demand signal 148a) in accordance with the parameter iniDutyAfterCoast of the selected parameter value set of FIGS. 12 and 13.

At block 1446, the start-up control module 148 sets the mode control signal 148b to a state indicative of the normal mode of operation, at which time the start-up control module 148 relinquishes control of the motor control circuit 102 to the modulation signal generation module 146.

At block 1448, the motor control circuit 102 runs in the normal mode of operation using the normal mode demand signal 107a and the normal mode theta signal 406a of FIG. 4.

The above process describes a two-step approach for starting up an electric motor, namely, a two-step approach using the first ramp-up time period and the second ramp-up time period described above in conjunction with FIG. 9. In general, starting up the motor can use only one ramp-up time period, or more than two ramp-up time periods.

While particular parameters and parameter values are described above in conjunction with FIG. 12, and particular logic is described above in conjunction with FIG. 13, other parameters, other parameter values, and other logic can be used.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of driving, with a motor control circuit, a multi-phase motor having a plurality of motor windings, the method comprising:

receiving, from outside of the motor control circuit, a selection signal;

identifying, with the motor control circuit, a set of parameter values from among a plurality of different sets of parameter values retained on the motor control circuit, wherein the plurality of different sets of parameter values is indicative of a corresponding plurality of different start-up signal characteristics of a plurality of drive signals coupled to the plurality of motor windings, wherein at least two of the plurality of different sets of parameter values are indicative of rotation of the multi-phase motor in the same direction, the identifying done in accordance with the selection signal;

determining, in accordance with the identified set of parameter values, with the motor control circuit, the start-up signal characteristics of the plurality of drive signals coupled to the plurality of motor windings, wherein the determined start-up signal characteristics of the plurality of drive signals comprise a respective ramped start-up of the electric motor during a respective ramp-up time period during a start-up mode of operation; and generating, with the motor control circuit, the plurality of drive signals comprising the determined start-up signal characteristics to start the multi-phase motor spinning.

2. The method of claim 1, further comprising:
receiving, from outside of the motor control circuit, a motor voltage signal, wherein the identifying the set of parameter values is done in accordance with both the selection signal and the motor voltage signal.

3. The method of claim 2, wherein the generating the plurality of drive signals comprises:
generating a corresponding plurality of modulated PWM waveforms, the plurality of modulated PWM waveforms having respective duty cycles that change with time according to a sine-drive modulation envelope, wherein the sine-drive modulation envelope comprises a frequency, wherein each one of the plurality of modulated PWM waveforms has a peak duty cycle, wherein the peak duty cycle of each one of the plurality of modulated PWM waveforms is related to an amplitude of a respective one of a plurality of sinusoidal current signals carried by the plurality of motor windings, and wherein the frequency of the modulation envelope is related to a frequency of the plurality of sinusoidal current signals.

4. The method of claim 3, wherein the ramped start-up comprises a ramp-up of at least one of the peak duty cycle of the modulated PWM waveform or the frequency of the sine-drive modulation envelope, wherein time varying characteristics of at least one of the peak duty cycle or the frequency during the ramp-up time period are selected in accordance with the identified set of parameter values.

5. The method of claim 1, wherein the generating the plurality of drive signals comprises:
generating a corresponding plurality of modulated PWM waveforms, the plurality of modulated PWM waveforms having respective duty cycles that change with time according to a sine-drive modulation envelope, wherein the sine-drive modulation envelope comprises a frequency, wherein each one of the plurality of modulated PWM waveforms has a peak duty cycle, wherein the peak duty cycle of each one of the plurality of modulated PWM waveforms is related to an amplitude of a respective one of a plurality of sinusoidal current signals carried by the plurality of motor windings, and wherein the frequency of the modulation envelope is related to a frequency of the plurality of sinusoidal current signals.

6. The method of claim 5, wherein the ramped start-up comprises a ramp-up of the peak duty cycle of the modulated PWM waveform during a ramp-up time period, wherein time varying characteristics of the peak duty cycle during the ramp-up time period are selected in accordance with the identified set of parameter values.

7. The method of claim 5, wherein the ramped start-up comprises a ramp-up of the frequency of the sine-drive modulation envelope during the ramp-up time period, wherein time varying characteristics of the frequency during the ramp-up time period are selected in accordance with the identified set of parameter values.

8. The method of claim 5, wherein the ramped start-up comprises:
a ramp-up of the peak duty cycle of the modulated PWM waveform during the ramp-up time period, wherein time varying characteristics of the peak duty cycle during the ramp-up time period are selected in accordance with the identified set of parameter values; and
a ramp-up of the frequency of the sine-drive modulation envelope during the ramp-up time period, wherein time varying characteristics of the frequency during the ramp-up time period are selected in accordance with the identified set of parameter values.

9. The method of claim 8, wherein the ramp-up time period is also selected in accordance with the identified set of parameter values.

10. The method of claim 5, wherein the ramp-up time period comprises a first ramp-up time period followed by a second different ramp-up time period.

11. The method of claim 10, wherein the ramped start-up comprises:
a ramp-up of at least the peak duty cycle of the modulated PWM waveform during the first ramp-up time period, wherein time varying characteristics of the peak duty cycle during the first ramp-up time period are selected in accordance with the identified set of parameter values, and
a ramp-up of at least the frequency of the sine-drive modulation envelope during the second ramp-up time period, wherein time varying characteristics of the frequency during the second ramp-up time period are selected in accordance with the identified set of parameter values.

12. The method of claim 11, wherein the first and second ramp-up time periods are also selected in accordance with the identified set of parameter values.

13. The method of claim 10, wherein the determined start-up signal characteristics comprise:
first ramp-up characteristics during the first ramp-up time period; and
second different ramp-up characteristics during the second ramp-up time period.

14. The method of claim 13, wherein the first ramp-up characteristics comprise first characteristics of the plurality of drive signals beginning at a time when the multi-phase motor is not spinning and ending at an end of the first ramp-up time period, wherein the first ramp-up time period comprises a first at least one cycle of the plurality of sinusoidal current signals, and wherein the second ramp-up characteristics comprise second characteristics of the plurality of drive signals beginning at a beginning of the second ramp-up time period and ending at an end of the second ramp-up time period, wherein the second ramp-up time period comprises a second at least one cycle of the plurality of sinusoidal current signals, wherein an end of the first at least one cycle is continuous in phase with a start of the second at least one cycle.

15. The method of claim 5, wherein the generating the plurality of drive signals comprises:
generating the plurality of drive signals such that, at an end of the ramp-up time period, a last one of the plurality of cycles of a selected one of the plurality of sinusoidal current signals ends at a zero current.

16. The method of claim 15, further comprising
stopping the plurality of drive signals for a coasting time period following the end of the ramp-up time period;
detecting a back EMF signal indicative of a zero back EMF voltage on a selected one of the plurality of motor windings while the plurality of drive signals are stopped, the detected back EMF signal indicative of an end of the coasting time period; and driving the plurality of motor windings with the plurality of sinusoidal current signals in a normal mode of operation in response to the detecting, wherein, in the normal mode of operation, a first cycle of a sinusoidal current signal on the selected one of the plurality of motor windings begins at zero current and at a phase continuous with a phase of the last one of the plurality of cycles of the sinusoidal current signal on the selected one of the plurality of motor windings at the end of the ramp-up time period.

17. The method of claim 1, wherein a value of the selection signal is determined based upon a load upon the multi-phase motor.

18. A motor control circuit for driving a multi-phase motor having a plurality of motor windings, the motor control circuit comprising a start-up control module configured to:

receive, from outside of the motor control circuit, a selection signal;

identify set of parameter values from among a plurality of different sets of parameter values retained on the motor control circuit, wherein the plurality of different sets of parameter values is indicative of a corresponding plurality of different start-up signal characteristics of a plurality of drive signals coupled to the plurality of motor windings, wherein at least two of the plurality of different sets of parameter values are indicative of rotation of the multi-phase motor in the same direction, the identifying done in accordance with the selection signal; and determine, in accordance with the identified set of parameter values, the start-up signal characteristics of the plurality of drive signals coupled to the plurality of motor windings, wherein the determined start-up signal characteristics of the plurality of drive signals comprise a respective ramped start-up of the electric motor during a respective ramp-up time period during a start-up mode of operation; wherein the motor control circuit is configured to:

generate the plurality of drive signals comprising the determined start-up signal characteristics to start the multi-phase motor spinning.

19. The motor control circuit of claim 18, wherein the start-up control module is further configured to:

receive a motor voltage signal, and to identify the set of parameter values in accordance with both the selection signal and the motor voltage signal.

20. The motor control circuit of claim 19, wherein the motor control circuit is configured to generate the plurality of drive signals by:

generating a corresponding plurality of modulated PWM waveforms, the plurality of modulated PWM waveforms having respective duty cycles that change with time according to a sine-drive modulation envelope, wherein the sine-drive modulation envelope comprises a frequency, wherein each one of the plurality of modulated PWM waveforms has a peak duty cycle, wherein the peak duty cycle of each one of the plurality of modulated PWM waveforms is related to an amplitude of a respective one of a plurality of sinusoidal current signals carried by the plurality of motor windings, and wherein the frequency of the modulation envelope is related to a frequency of the plurality of sinusoidal current signals.

21. The motor control circuit of claim 20, wherein the ramped start-up comprises a ramp-up of at least one of the peak duty cycle of the modulated PWM waveform or the frequency of the sine-drive modulation envelope, wherein time varying characteristics of at least one of the peak duty cycle or the frequency during the ramp-up time period are selected in accordance with the identified set of parameter values.

22. The motor control circuit of claim 18, wherein the motor control circuit is configured to generate the plurality of drive signals by:

generating a corresponding plurality of modulated PWM waveforms, the plurality of modulated PWM waveforms having respective duty cycles that change with time according to a sine-drive modulation envelope, wherein the sine-drive modulation envelope comprises a frequency, wherein each one of the plurality of modulated PWM waveforms has a peak duty cycle, wherein the peak duty cycle of each one of the plurality of modulated PWM waveforms is related to an amplitude of a respective one of a plurality of sinusoidal current signals carried by the plurality of motor windings, and wherein the frequency of the modulation envelope is related to a frequency of the plurality of sinusoidal current signals.

23. The motor control circuit of claim 22, wherein the ramped start-up comprises a ramp-up of the peak duty cycle of the modulated PWM waveform during a ramp-up time period, wherein time varying characteristics of the peak duty cycle during the ramp-up time period are selected in accordance with the identified set of parameter values.

24. The motor control circuit of claim 22, wherein the ramped start-up comprises a ramp-up of the frequency of the sine-drive modulation envelope during the ramp-up time period, wherein time varying characteristics of the frequency during the ramp-up time period are selected in accordance with the identified set of parameter values.

25. The motor control circuit of claim 22, wherein the ramped start-up comprises:

a ramp-up of the peak duty cycle of the modulated PWM waveform during the ramp-up time period, wherein time varying characteristics of the peak duty cycle during the ramp-up time period are selected in accordance with the identified set of parameter values; and a ramp-up of the frequency of the sine-drive modulation envelope during the ramp-up time period, wherein time varying characteristics of the frequency during the ramp-up time period are selected in accordance with the identified set of parameter values.

26. The motor control circuit of claim 25, wherein the ramp-up time period is also selected in accordance with the identified set of parameter values.

27. The motor control circuit of claim 22, wherein the ramp-up time period comprises a first ramp-up time period followed by a second different ramp-up time period.

28. The motor control circuit of claim 27, wherein the ramped start-up comprises:

a ramp-up of at least the peak duty cycle of the modulated PWM waveform during the first ramp-up time period, wherein time varying characteristics of the peak duty cycle during the first ramp-up time period are selected in accordance with the identified set of parameter values, and a ramp-up of at least the frequency of the sine-drive modulation envelope during the second ramp-up time period, wherein time varying characteristics of the frequency during the second ramp-up time period are selected in accordance with the identified set of parameter values.

29. The motor control circuit of claim 28, wherein the first and second ramp-up time periods are also selected in accordance with the identified set of parameter values.

30. The motor control circuit of claim 27, wherein the determined start-up signal characteristics comprise:
- first ramp-up characteristics during the first ramp-up time period; and
- second different ramp-up characteristics during the second ramp-up time period.

31. The motor control circuit of claim 30, wherein the first ramp-up characteristics comprise first characteristics of the plurality of drive signals beginning at a time when the multi-phase motor is not spinning and ending at an end of the first ramp-up time period, wherein the first ramp-up time period comprises a first at least one cycle of the plurality of sinusoidal current signals, and wherein the second ramp-up characteristics comprise second characteristics of the plurality of drive signals beginning at a beginning of the second ramp-up time period and ending at an end of the second ramp-up time period, wherein the second ramp-up time period comprises a second at least one cycle of the plurality of sinusoidal current signals, wherein an end of the first at least one cycle is continuous in phase with a start of the second at least one cycle.

32. The motor control circuit of claim 22, wherein the generating the plurality of drive signals comprises:
- generating the plurality of drive signals such that, at an end of the ramp-up time period, a last one of the plurality of cycles of a selected one of the plurality of sinusoidal current signals ends at a zero current.

33. The motor control circuit of claim 32, wherein the start-up control module is further configured to:
- stop the plurality of drive signals for a coasting time period following the end of the ramp-up time period; and
- detect a back EMF signal indicative of a zero back EMF voltage on a selected one of the plurality of motor windings while the plurality of drive signals are stopped, the detected back EMF signal indicative of an end of the coasting time period; wherein the motor control circuit is further configured to:
- drive the plurality of motor windings with the plurality of sinusoidal current signals in a normal mode of operation in response to the detecting, wherein, in the normal mode of operation, a first cycle of a sinusoidal current signal on the selected one of the plurality of motor windings begins at zero current and at a phase continuous with a phase of the last one of the plurality of cycles of the sinusoidal current signal on the selected one of the plurality of motor windings at the end of the ramp-up time period.

34. The motor control circuit of claim 18, wherein a value of the selection signal is determined based upon a load upon the multi-phase motor.

35. A method of driving, with a motor control circuit, a multi-phase motor having a plurality of motor windings, the method comprising:
- receiving, from outside of the motor control circuit, a selection signal;
- identifying, with the motor control circuit, a set of parameter values from among a plurality of sets of parameter values retained on the motor control circuit, the identifying done in accordance with the selection signal;
- determining, in accordance with the identified set of parameter values, with the motor control circuit, start-up signal characteristics of a plurality of drive signals coupled to the plurality of motor windings, wherein the determined start-up signal characteristics of the plurality of drive signals comprise a ramped start-up of the electric motor during a ramp-up time period during a start-up mode of operation;
- generating, with the motor control circuit, the plurality of drive signals comprising the determined start-up signal characteristics to start the multi-phase motor spinning; and
- receiving, from outside of the motor control circuit, a motor voltage signal, wherein the identifying the set of parameter values is done in accordance with both the selection signal and the motor voltage signal.

36. A motor control circuit for driving a multi-phase motor having a plurality of motor windings, the motor control circuit comprising a start-up control module configured to:
- receive, from outside of the motor control circuit, a selection signal;
- identify set of parameter values from among a plurality of sets of parameter values retained on the motor control circuit, the identifying done in accordance with the selection signal; and
- determine, in accordance with the identified set of parameter values, start-up signal characteristics of a plurality of drive signals coupled to the plurality of motor windings, wherein the determined start-up signal characteristics of the plurality of drive signals comprise a ramped start-up of the electric motor during a ramp-up time period during a start-up mode of operation; wherein the motor control circuit is configured to:
- generate the plurality of drive signals comprising the determined start-up signal characteristics to start the multi-phase motor spinning, wherein the start-up control module is further configured to:
- receive a motor voltage signal, and to identify the set of parameter values in accordance with both the selection signal and the motor voltage signal.

* * * * *